(12) United States Patent
Askeland et al.

(10) Patent No.: US 6,254,217 B1
(45) Date of Patent: Jul. 3, 2001

(54) APPARATUS AND METHOD FOR HUE SHIFT COMPENSATION IN A BIDIRECTIONAL PRINTER

(75) Inventors: Ronald A Askeland; Ronald J. Burns, both of San Diego, CA (US); William S Osborne, Camas, WA (US)

(73) Assignee: Hewlett-Packard Company, Palo ALto, CA (US)

( * ) Notice: Subject to any disclaimer, the term of this patent is extended or adjusted under 35 U.S.C. 154(b) by 0 days.

(21) Appl. No.: 09/363,943

(22) Filed: Jul. 29, 1999

(51) Int. Cl.[7] ............................................. B41J 2/21
(52) U.S. Cl. .................... 347/43; 345/15; 345/40
(58) Field of Search ........................... 347/40, 41, 43, 347/9, 12, 13, 14, 15; 358/1.8

(56) References Cited

U.S. PATENT DOCUMENTS

| | | | |
|---|---|---|---|
| 4,855,752 | 8/1989 | Bergstedt ............................ | 347/41 |
| 4,952,942 * | 8/1990 | Kanome et al. ..................... | 347/43 |
| 4,999,646 | 3/1991 | Trask ................................... | 347/41 |
| 5,402,162 * | 3/1995 | Fusting et al. ...................... | 347/43 |
| 5,485,180 | 1/1996 | Askeland et al. ................... | 347/15 |
| 5,500,661 * | 3/1996 | Matsubara et al. ................. | 347/43 |
| 5,555,006 | 9/1996 | Cleveland et al. .................. | 347/41 |
| 5,600,353 | 2/1997 | Hickman et al. .................... | 347/43 |
| 5,625,391 * | 4/1997 | Hirabayashi et al. .............. | 347/43 |
| 5,644,683 | 7/1997 | Ross et al. ........................... | 358/1.8 |
| 5,754,198 * | 5/1998 | Nishikawa .......................... | 347/43 |
| 5,844,582 * | 12/1998 | Shioya ................................. | 347/43 |
| 5,903,290 | 5/1999 | Nicoloff, Jr. et al. .............. | 347/40 |
| 6,019,454 * | 2/2000 | Serra et al. ......................... | 347/43 |

FOREIGN PATENT DOCUMENTS

| | | |
|---|---|---|
| 0622211A | 11/1994 | (EP) . |
| 0631257A | 12/1994 | (EP) . |
| 0730968A | 9/1996 | (EP) . |
| 0863480A | 9/1998 | (EP) . |
| 358215351 * | 12/1983 | (JP) .................................. 347/41 |

OTHER PUBLICATIONS

EP Search Report EP 00306040(cited references listed above) Feb. 12, 2001.

* cited by examiner

Primary Examiner—N. Le
Assistant Examiner—Lamson D. Nguyen
(74) Attorney, Agent, or Firm—Robert C. Sismilich

(57) ABSTRACT

An printing apparatus and method for reducing hue shift due to differing deposition orders of different color ink drops. A differing deposition order occurs in bidirectional inkjet printers with printheads that deposit overlapping drops in a single scan in either a forward or rearward direction. Different print masks for each color ink are used to govern ink drop deposition in the different scan directions in order to vary the deposition order and/or number of drops deposited in a given location. A different mask pattern is applied to a top and bottom set of nozzles corresponding to the print advance height. This technique reduces the perceived difference in color shade between an area of a composite color printed in the forward direction followed by the rearward direction, and an area of the same composite color printed in the rearward direction followed by the forward direction. An inkjet printer constructed in accordance with the present invention minimizes hue shift while still retaining the advantages of multipass bidirectional printing, without the need to reduce throughput or increase the manufacturing cost or complexity of the printer.

45 Claims, 15 Drawing Sheets

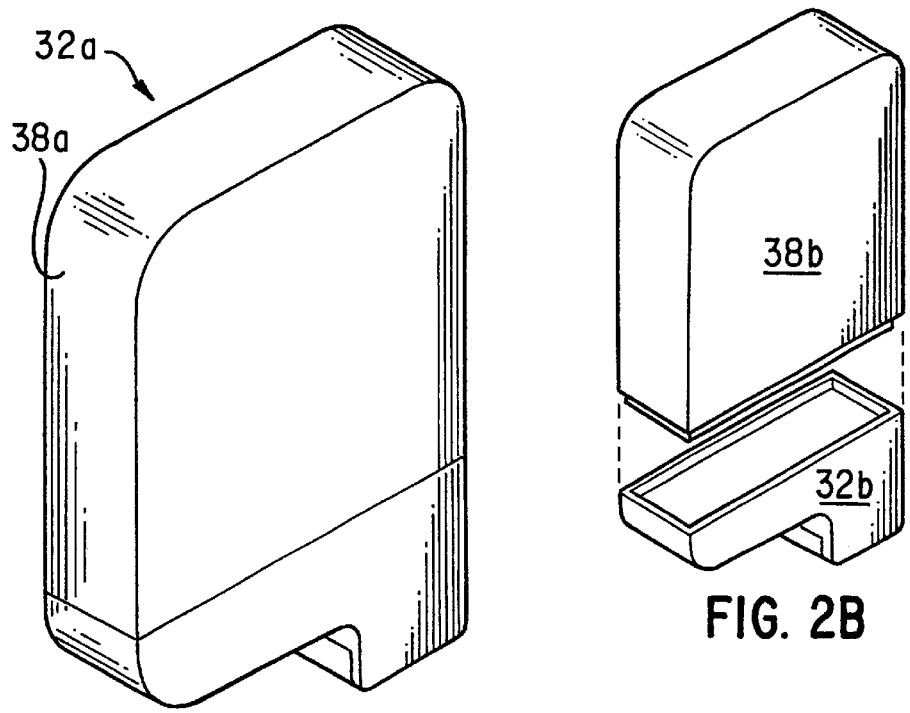
FIG. 2A
FIG. 2B
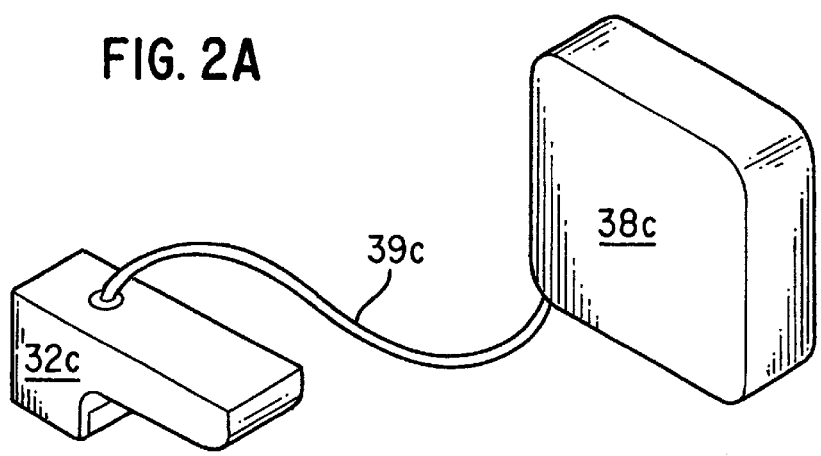
FIG. 2C
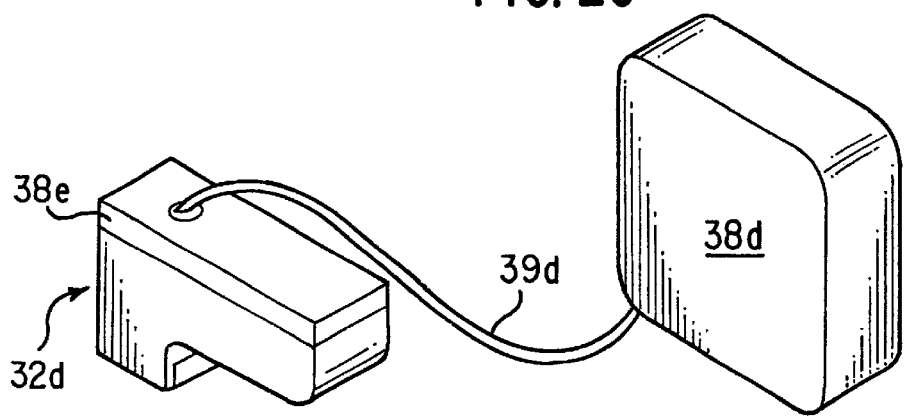
FIG. 2D

APPARATUS AND METHOD FOR HUE SHIFT COMPENSATION IN A BIDIRECTIONAL PRINTER

CROSS-REFERENCE TO RELATED APPLICATIONS

This application relates to the subject matter disclosed in the following applications: Ser. No. 08/682,864, by Majette et al., filed Jul. 2, 1996, titled "Minimizing Color Shift Due to Varying Deposition Order in a Printer with Bidirectionally Scanning In-Line Pens"now U.S. Pat. No. 6,086,181; Ser. No. 08/810,747, by Serra, filed Mar. 4, 1997, titled "Bidirectional Color Printmodes with Semistaggered Swaths to Minimize Hue Shift and Other Artifacts"; Ser. No. 09/302,860, by Skene et al., filed Apr. 30, 1999, titled "Method and Apparatus for Minimizing Color Hue Shifts in Bi-Directional Inkjet Printing"; and Ser. No. 09/303,249, by Ross, filed Apr. 30, 1999, titled "Method of Minimizing Color Hue Shifts in a Single-Pass, Bidirectional Inkjet Printer Using Direction Dependent Color Maps"; all of which are assigned to the assignee of the present invention and hereby incorporated by reference.

FIELD OF THE INVENTION

The present invention relates generally to printing color text and graphics on printing media using inkjet printers. It relates more particularly to improved print quality in bidirectional swath inkjet printing.

BACKGROUND OF THE INVENTION

Inkjet printers, and thermal inkjet printers in particular, have come into widespread use in businesses and homes because of their low cost, high print quality, and color printing capability. The operation of such printers is relatively straightforward. In this regard, drops of a colored ink are ejected onto the print media such as paper or transparency film during a printing operation. These drops of ink combine on the print media to form the text and images perceived by the human eye. A key component of the printer for the deposition of these ink drops is the printhead, which is connected to an ink supply and contains an arrangement of nozzles and a mechanism which allows ink drops to be controllably ejected from each individual nozzle. One or more printheads may be contained in a print cartridge, which may either contain the supply of ink for each printhead or be connected to an ink supply located off-cartridge. Inkjet printers may use a number of different ink colors. An inkjet printer frequently can accommodate two to four print cartridges. The cartridges typically are mounted side-by-side in a carriage which scans the cartridges back and forth within the printer in a forward and a rearward direction above the media during printing such that the cartridges move sequentially over a given location, called a pixel, on the media which is to be printed. Each print cartridge typically has an arrangement of printhead nozzles through which the ink is controllably ejected onto the print media, and thus a certain width of the media corresponding to the layout of the nozzles on the print cartridge, can be printed during each scan, forming a printed swath. The printer also has a print medium advance mechanism which moves the media relative to the printheads so that, by combining scans of the print cartridges back and forth across the media with the advance of the media relative to the printheads, the entire printable area of the media can be printed.

To avoid printing defects that adversely affect print quality, such as bleeding of one color area into another, bands of unprinted color, and warping or wrinkling of the print media, most printers do not print all drops of all ink colors in all pixel locations addressable in one single forward or rearward scan and then advance the media by the height of the nozzle arrangement. Rather, multiple scans are used to fully ink any given pixel location, with the media advanced after each scan by a portion of the height of the nozzle arrangement. Only a fraction of the total ink required in each section of the image is laid down in any single scan. Areas left unprinted are filled in by one or more later passes. For each scan, a group of printmasks, or patterns used in printing a section of nozzles for particular printheads, determine which drops of which inks are deposited at each pixel location. The printmasks mix up the nozzles used on different scans in such a way as to reduce these undesirable visible printing defects by controlling the amount and location of liquid ink that is on the page at any given time. In other words, the printmasks govern the final step of the printing process, determining in which pass or passes each pixel location will be addressed, after prior rendition steps have already determined (from the digital data for the image to be printed) the required color and intensity for each pixel location.

Some printers have a mode in which they only deposit ink while scanning in one direction; for example, in the forward scan but not the rearward scan. This print mode is known as unidirectional printing. Conversely, some printers have a mode in which they deposit ink while scanning in both directions, known as bidirectional printing. Bidirectional printing has the advantage of reduced printing time, because it avoids the wasted motion of moving the carriage in the rearward direction without printing required for unidirectional printing. However, bidirectional printing can introduce a print quality defect known as color hue shift, as explained below.

Each printhead deposits ink of a different color on the media. In one commonly used arrangement, the inks are the primary subtractive colors magenta, cyan, and yellow. Alternatively the printer can use more than three color inks, some of which are lighter and darker versions of a given color shade. In some embodiments, there is also a black ink, drops of which may be used during color printing to form the darker shades of colors. Drops of the color inks can be combined in the same pixels to form a range of perceived colors to the human eye. For example, superimposing drops of magenta and cyan in the same pixel location produces a blue composite color pixel. If there were no interactions between the ink and the media, the order in which the magenta and cyan ink drops are deposited on the print media does not matter. However, the ink and the media do interact, and thus the color shade or hue that is perceived by the observer depends on the order in which the drops of the different color inks are deposited on the media.

It is the arrangement of the print cartridges in the carriage that causes the differing order of drop deposition that creates a hue shift between different regions of what should be the same color in bidirectional printing. For example, in a typical inkjet printer cyan, black, magenta, and yellow printheads are aligned side-by-side in the carriage. When the carriage sweeps in the forward direction, the yellow printhead will pass over a particular pixel location on the print media first, followed by the magenta, then the black, and finally the cyan. If a blue color is to be printed in the pixel location, the magenta drop would be deposited before the cyan. In contrast, when the carriage sweeps in the rearward direction, the cyan printhead will pass over a particular pixel location on the print media first, followed by the black, magenta, then yellow printheads. If a blue color is to be printed in the pixel location, the cyan drop would be deposited before the magenta.

The hue shift problem is most noticeable when a contiguous area of pixels spanning more than one scan of the cartridges over the media is printed with the same composite color, in particular a deep shade of two primaries such as blue or green (green is produced by combined cyan and yellow drops). This printing operation produces perceptibly different bands of color shades between bands generated by printing in the forward direction followed by the rearward direction, and bands generated by printing in the rearward direction followed by the forward direction.

There have been two general approaches to reducing or eliminating the problems of hue shift in bidirectional color inkjet printing. These approaches usually improve print quality at the cost of reduced throughput (eg. slower printing speed) or increased printer cost or complexity. The first general approach is to eliminate hue shift by depositing the color ink drops in all pixel locations on the print media in the same order. In one prior art implementation of this solution, the printheads are not in-line but rather are offset from each other in the media advance direction by the full height of the nozzle array, so that only drops of one color can be deposited in a given pixel location on a single forward or rearward scan of the carriage. However, this implementation results in a wide print zone requiring extra cost and complexity to hold the paper flat and without relative motion. An alternate implementation uses in-line printheads arranged in the carriage not only in a cyan-magenta-yellow order but also in a yellow-magenta-cyan order, with the first group used in the forward scan direction and the second group used in the rearward scan direction to ensure a consistent order of drop deposition. However, this solution also adds cost and complexity to the plumbing of the ink supply or to the print cartridges.

A third prior art implementation that is the subject of the above-mentioned Majette application requires a complex medium advance mechanism that can also reverse, instead of merely advancing, the media movement between scans in order to always lay the drops of different color inks down in the same order. A variation of this implementation also disclosed in Majette masks off a top group of nozzles of each printhead in a forward scan and a bottom group of nozzles in a rearward scan to achieve the same effect without the need for a complex medium advance mechanism, but at a cost of reduced throughput since the reduced effective width of the scan path requires more scans to fully ink all pixel locations on a page. A similar throughput reduction results from a prior art implementation that eliminates hue shift by scanning in both the forward and rearward directions before advancing a portion of the nozzle height.

The second general prior art solution to solving the hue shift in bidirectional color inkjet printing is to reduce the hue shift to make it less perceptible to the human eye. Since the hue shift is most noticeable between bands, one implementation disclosed in the above-mentioned Majette application advances the media in uneven portions; for example, by a larger portion of the width of the nozzle arrangement in the forward direction, and a smaller portion in the rearward direction. This results in one wider band having one hue and one narrower band having the other hue, thus reducing the perceivability of the shift. However, the hue of each bands is still the same as it previously was, and the print quality improvement is limited by how much the band can be narrowed; if it becomes too narrow, or if a printhead defect affects a region of nozzles, medium-advance defects such as bands of unprinted color will appear. An alternative implementation which uses multiple drops of each color ink to produce the composite color diminishes the bidirectional color shift by averaging the order in which the colors are printed. For example, if two drops of each color are used to form the composite color, a band printed in the forward direction before the rearward direction will have pixels in which the bottom-to-top order of drops will be magenta, cyan, cyan, and magenta. Conversely, in a band printed in the rearward direction before the forward direction, the order will be cyan, magenta, magenta, and cyan. However, in many cases this is insufficient to adequately reduce the hue shift effect of ink/media interactions.

Accordingly, the need still exists for a color inkjet printer having a print mode that can significantly reduce the problem of hue shift without compromising throughput and without requiring extra cost or complexity in the printing mechanism.

SUMMARY OF THE INVENTION

In a preferred embodiment, the present invention may be implemented as a novel inkjet printer that uses print masks for the different color inks to adjust the order of drop deposition, and the amounts of each different color ink deposited, to minimize hue shift. It provides this improvement in print quality while still retaining all the advantages of multipass bidirectional printing, without the need to reduce throughput or increase the manufacturing cost or complexity of the printer. The printer has multiple printheads of different color inks mounted in given positions on a carriage that moves in a scan direction over a print medium such that, in a single scan of the carriage in a forward or a rearward direction, both color inks can be deposited in at least some of the same locations to form a composite color. A print controller controls the scan, the advancement of the print medium after a scan, and the deposition of ink drops on the medium. In the preferred embodiment, the printheads pass over each printable area of the medium in both a forward and rearward direction in order to fully print the image. The printer uses separate print masks to govern the ink drop deposition in the forward and rearward directions for each intensity level implemented. The print masks have mask pattern that cooperate to adjust the order of drop deposition in order to make areas printed with the composite color appear similar regardless of whether the area was printed in the forward direction before the rearward direction, or vice-versa. The mask patterns typically are different for different ink colors, for forward and rearward scans, and for top and bottom groups of printhead nozzles. The ejection of ink from each nozzle is individually controllable by the print controller according to the print masks and the position of the printhead along the scan axis.

In the preferred embodiment, the nozzles of all printheads are mounted in-line with each other so that they print the same area of the medium during a single scan, while in alternate embodiments they are offset so as only partially overlap the areas printed in a single scan. The drops of different color inks may completely or partially overlap on the medium to form the composite color. The ink colors used in the preferred embodiment are the primary subtractive colors cyan, magenta, and yellow, while alternate embodiments uses inks with different brightnesses or chroma, or other colors. The ink can be contained in the same print cartridge housing the printhead, or supplied to the printhead from a reservoir off-carriage.

In addition to varying the order of drop deposition, in some embodiments the mask patterns cooperate to vary the number of drops of different color inks deposited in different locations on the medium. Each medium location may be divided into at least two sublocations in some embodiments, with the order and number of drops deposited in each sublocation varying.

An alternate embodiment of the present invention is a method for printing on a print medium with a bidirectional printer having two or more printheads with different color inks oriented to print on an area of the medium in one order in the forward scan direction and in a different order in the rearward scan direction. The method prints a composite color in one area of the medium by scanning forward then rearward, and in another area by scanning rearward then forward. During printing in the forward scan direction, a forward print mask is used for each printhead; while printing in the rearward direction, a rearward print mask is used. The mask patterns cooperate with each other to reduce hue shift between the two areas by varying the drop deposition order and/or the number of drops of different color inks in different pixels or subpixels within these areas. The printhead nozzles are divided into two or more groups, with a different mask pattern applied to each group. In most embodiments the mask pattern is smaller than the number of nozzles and the number of pixels on the medium in the scan direction, so the mask is replicated as needed to cover all the nozzles of each group, and repeated during printing to cover all pixels on the medium. The method thus performs a first scan in the forward direction using the forward print masks, a second scan in the rearward direction using the rearward print masks, followed by a third scan like the first. Because the medium is advanced between scans a distance which is a portion of the width of the ink swath printed on each scan, this method results in a first overlapped subswath printed in the forward direction followed by the rearward direction, and a second overlapped subswath printed in the rearward direction followed by the forward direction. Areas of the same composite color in the first and second subswaths have a similar hue due to the patterns and usage of the print masks.

The present invention is usable with bidirectional swath printers using two or more passes to fully ink a swath. Other aspects and advantages of the present invention will become apparent from the following detailed description, taken in conjunction with the accompanying drawings, illustrating by way of example the principles of the invention.

BRIEF DESCRIPTION OF THE DRAWINGS

FIGS. 2A–2D are schematic representations of printhead and ink reservoir configurations usable with the printer of FIG. 1.

DESCRIPTION OF THE PREFERRED EMBODIMENT

Figure 1:
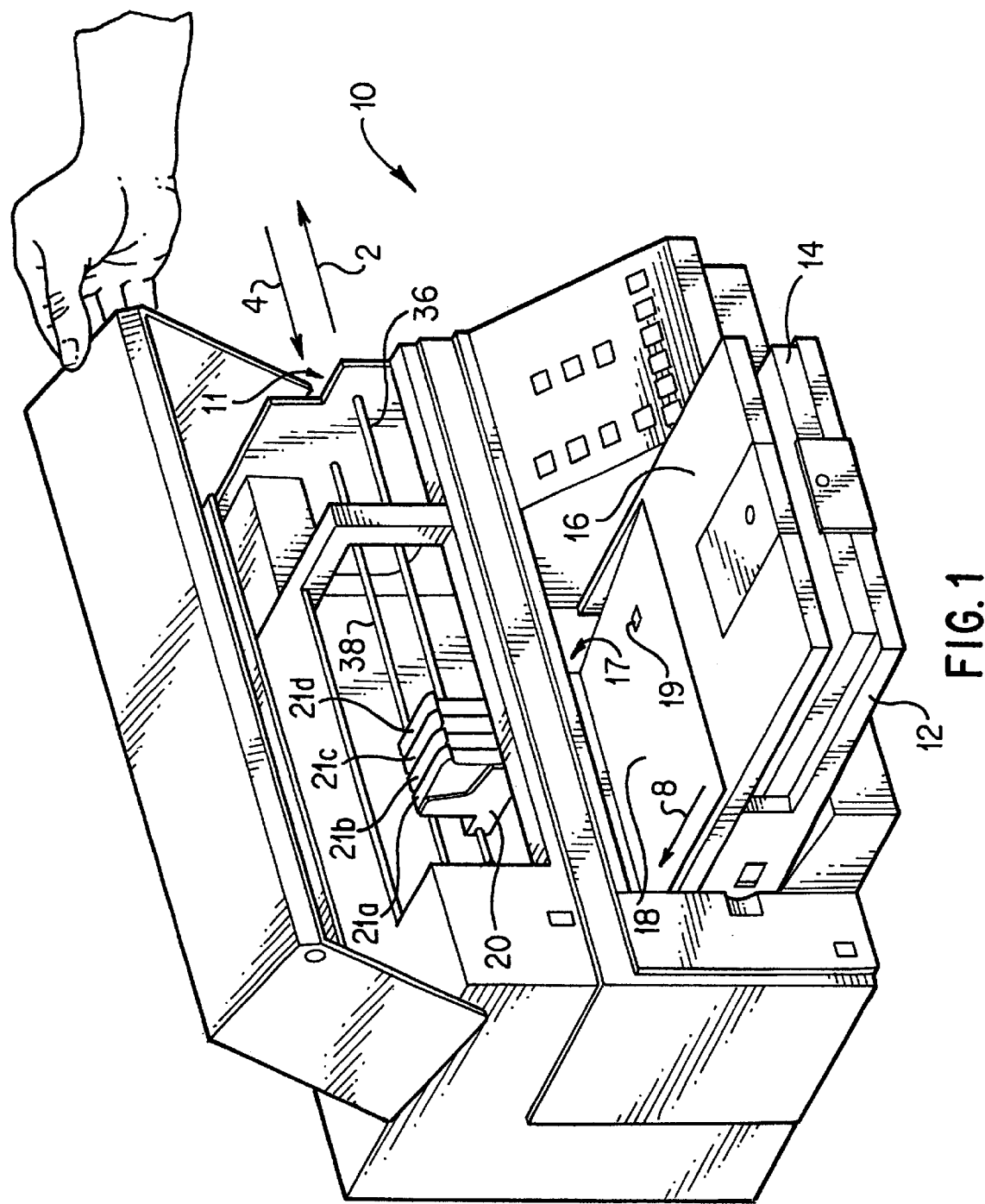
FIG. 1 is a perspective view of an inkjet printer embodying the present invention.

Referring now to the drawings, and more particularly to FIG. 1, there is illustrated a printer 10 which is constructed in accordance with the present invention. The printer 10 includes a frame indicated generally at 11 on which a carriage 20 is moveably mounted. The carriage 20 has stalls for holding at least two printheads 21 (FIG. 1 illustrates by way of example four printheads 21) and transporting them in a printing orientation adjacent the surface of a print medium 18 having a plurality of pixel locations such as pixel location 19. The carriage 20 is moveable along a scan axis in a forward direction 2 and a rearward direction 4. Each printhead 21 controls the deposition on the medium 18 of one or more drops of a different color ink. The printer 10 also has a print medium advance mechanism indicated generally at 17 mounted to the frame 11 which advances the print medium 18 along a medium advance axis 8 (the print medium advance mechanism 17 is well known to those skilled in the art, and will not be discussed further hereinafter). By combining the movement of the carriage 20 along the scan axis with the movement of the print medium 18 by the print medium advance mechanism 17 along the medium advance axis 8, the printheads 21 can deposit drops of ink at each individual one of the pixel locations on the print medium 18 when the carriage is moving in both the forward scan direction 2 and the rearward scan direction 4.

Figure 3:
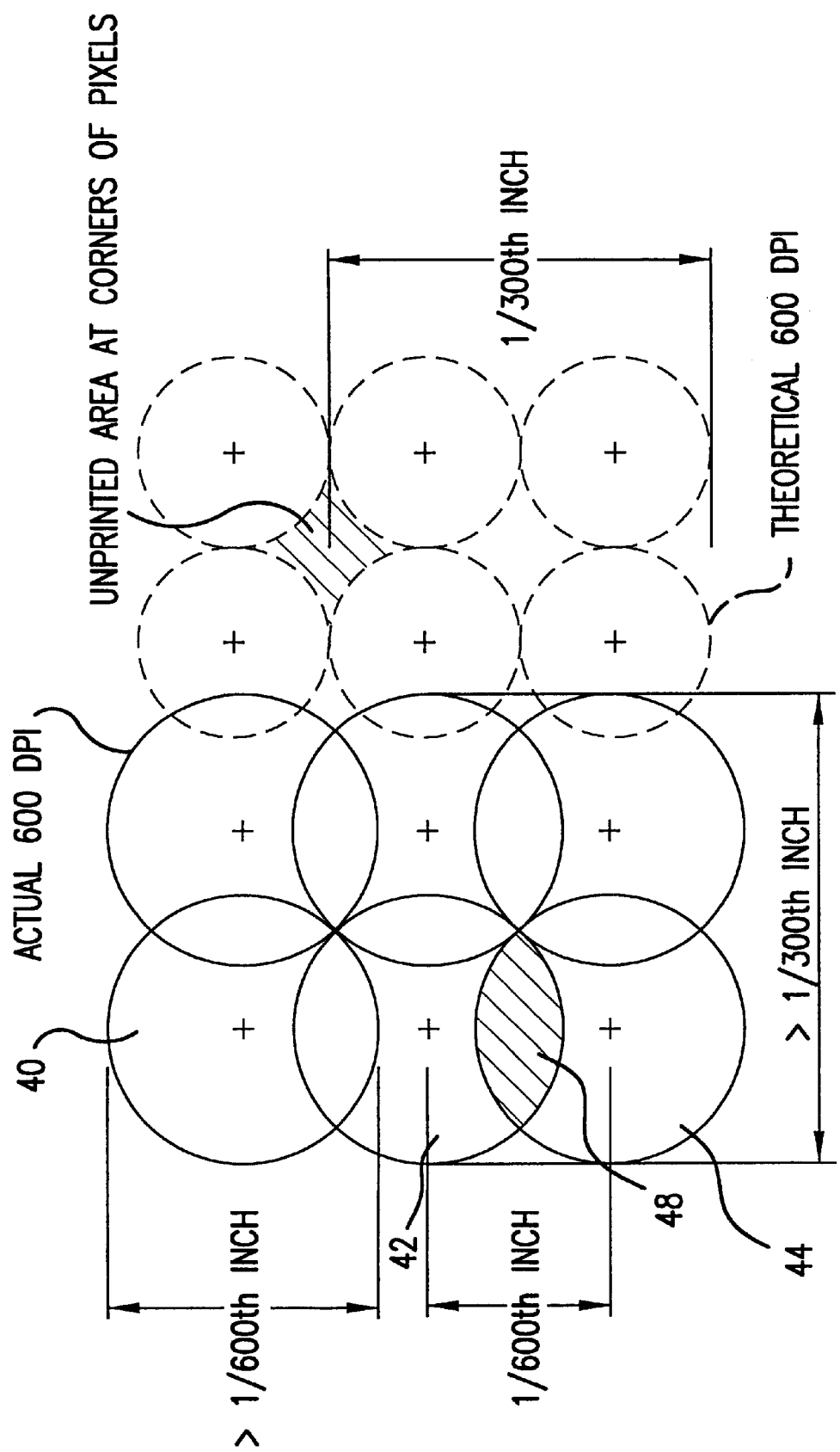
FIG. 3 is a schematic diagram illustrating the relationship between image pixels and dots printed on a print medium to represent the image pixels, and illustrating dot-on-dot and dot-next-to-dot printing modes.

Furthermore, the printheads 21 can sequentially deposit at least some drops of each different color ink at selected ones of a set of pixel locations defining an image swath during a single scan of the carriage in either the forward direction 2 or the rearward direction 4, with the drops at least partially overlapping to form a composite color as best illustrated in FIG. 3. While the pixel locations 19 are substantially square, each deposited ink drop covers a substantially round location of the medium 18. In order to avoid unprinted areas 46 at the corners of square pixels, the printheads 21 deposit oversized drops which fully cover and extend beyond the borders of the corresponding pixel. Therefore, a composite color will result either with dot-on-dot printing, where each of at least two different color inks are deposited at a location 40, or with dot-next-to-dot printing, where one color ink is deposited at location 42, and a different color is deposited at location 44, with the overlapping area 48 containing the composite color.

Figure 4:
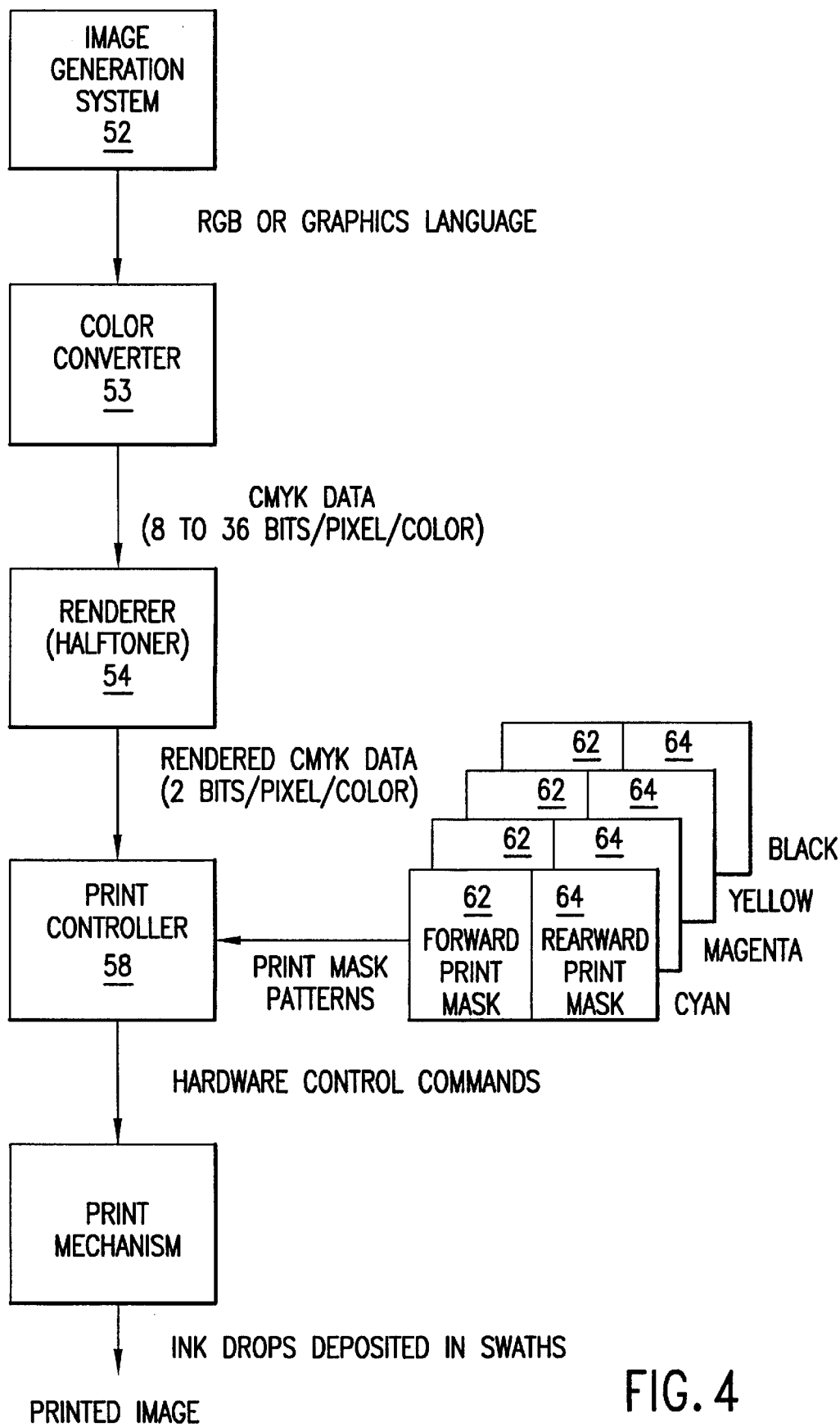
FIG. 4 is a block diagram illustrating the image processing stages for printing the image on the printer of FIG. 1.

As best seen in FIG. 4, the printer 10 also includes a print controller 58 which controls the movement of the carriage 20, the operation of the print medium advance mechanism 17, and the deposition on the print medium 18 of the different color inks. The print controller 58 uses a forward print mask 62 and a rearward print mask 64 for each printhead 21 to govern the deposition of the different color inks in a region of pixel locations corresponding to the size of the mask when the carriage is moved in the forward 2 and the rearward 4 directions respectively. As will be discussed in greater detail hereinafter, the print masks 62–64 have mask patterns which work together to adjust the order of ink drop deposition and the number of drops deposited for each mask location such that an area of pixel locations printed with the composite color using the print masks 62–64 has a similar color shade regardless of whether the area is first printed with the carriage moving in the forward direction or the rearward direction. Thus the hue shift between the two areas due to the order of ink drop deposition is greatly reduced, which is an important aspect of the present invention.

Figure 5:
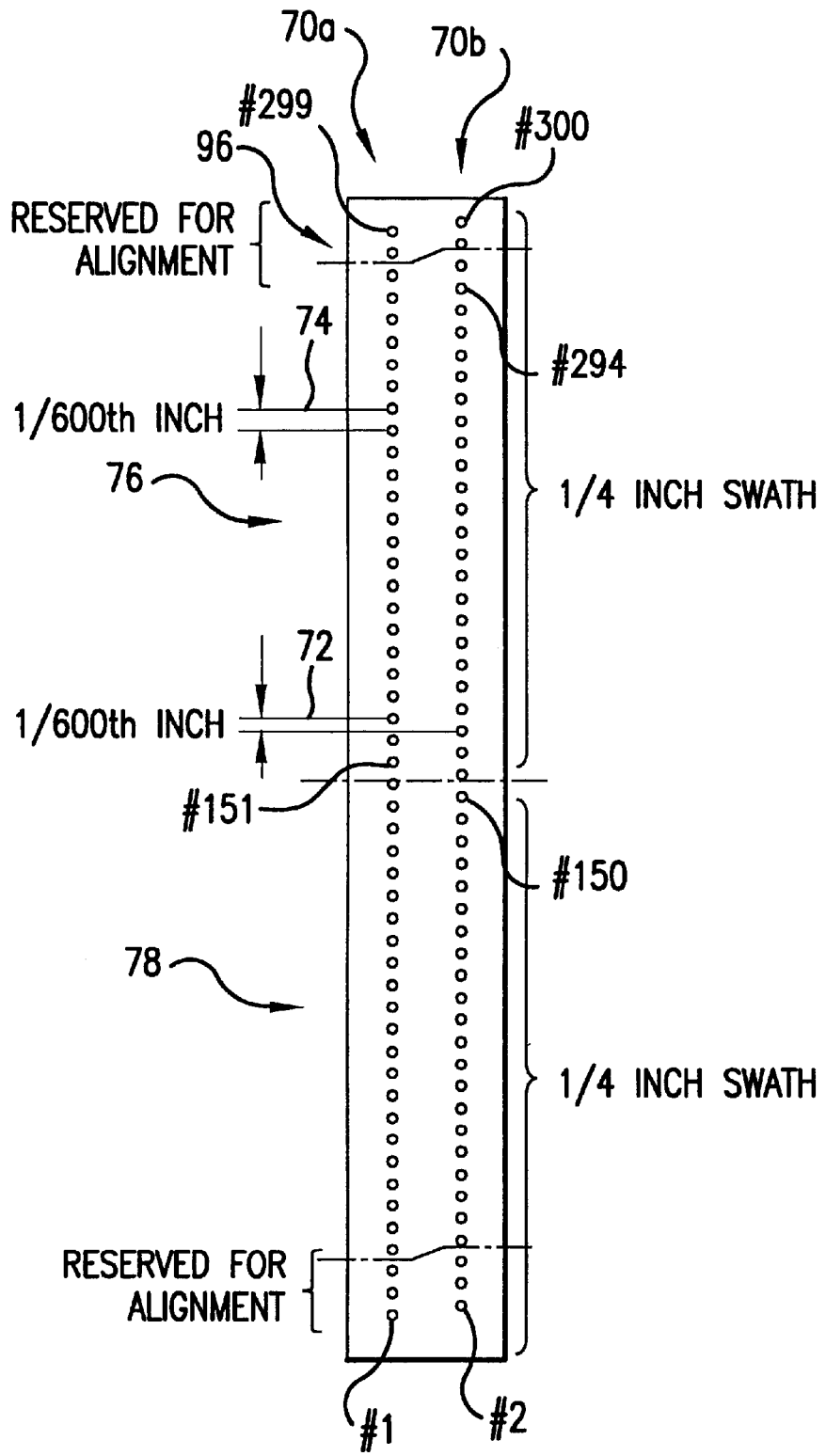
FIG. 5 is a schematic bottom view of the nozzle portions of a printhead of the printer of FIG. 1 as seen looking up from the print medium.

Considering now the printheads 21 in greater detail with reference to FIGS. 1 and 5, each printhead 21 has an arrangement of ink nozzles 70 through which ink drops are controllably ejected for deposition onto the print medium 18 as the carriage 20 moves the printheads 21 over the medium 18 during a forward or rearward scan. As is well known to those skilled in the art, printheads are typically formed on silicon substrates. One or more printheads, each for a different ink, may be formed on a single substrate. The position of the carriage 20 and the printheads 21 as they traverse back and forth across the medium 18 is determined from an encoder strip 38. Heating elements associated with the ink nozzles are operated by the print controller 58 to selectively fire the various ink nozzles on each printhead 21 at the appropriate time during a carriage scan when the printheads 21 are located adjacent specific pixel locations 19 in order to form the colors and intensities corresponding to the image to be printed, as is known to those skilled in the art. As will be discussed hereinafter, the print masks 62–64 are utilized by the print controller 58 for selectively firing the nozzles 70.

Considering now the exemplary arrangement of ink nozzles 70 in more detail with reference to FIG. 5, the nozzles 70 are laid out along each printhead 21 logically in only one column; but physically the nozzles 70 are staggered laterally to permit very close spacing along the column axis. Therefore to obtain the patterns described herein the various nozzles 70 are fired selectively and rapidly many times, in careful synchronism with scanning of the printhead 21 across the print medium 18, taking into account not only the scanning motion across the page but also the nozzle staggering across the printhead 21. In the representative implementation illustrated in FIG. 5 of a printer that can print 600 dots per inch in the media advance direction 8, the printhead for each color has 300 nozzles. The spacing between staggered nozzles 72 is $\frac{1}{600}^{th}$ inch, though the spacing between nozzles in a physical column 74 is $\frac{1}{300}^{th}$ inch. Therefore, the nozzles are capable of depositing a swath on the media 18 which has a maximum height in the media advance direction 8 of one-half inch. Six nozzles at the top and bottom of the printhead (nozzles #1 through #6 and #295 through #300) are reserved for alignment of the printheads 21 to each other, leaving a zone of two hundred eighty-eight contiguous nozzles for printing. For alignment purposes this usable zone can be selected upward or downward, as known to those skilled in the art, and so alignment will not be discussed further beyond noting that for purposes of illustration herein nozzles #7 through #294 will be denoted as the two hundred eighty-eight printing nozzles. The present invention is not limited to the number or arrangement of nozzles discussed herein.

Before discussing the printer 10 in further detail, it is helpful for understanding the present invention to briefly discuss how a limited number of color inks combine to form a range of printed colors. A printer according to the present invention frequently uses three different color inks which are the subtractive primary colors magenta, cyan, and yellow. These colors can be combined to form composite colors; for example, the additive primary colors: magenta and yellow form red, magenta and cyan form blue, and cyan and yellow form green. By varying the number of drops of each color, a range of different colors can be printed, as is known to persons skilled in the art. The present invention is not limited to a printer using the three primary subtractive colors; any set of colors and number of colors that can be combined to form adequate printed images may be used. For example, some printers use a number of different shades or brightnesses (chroma) of at least two different color inks to print color images rather than the three subtractive primary colors and black. However, for illustrative purposes, the invention will be discussed only with reference to the three primary subtractive colors hereinafter.

As best illustrated in FIG. 3, in dot-on-dot printing, at least one drop of each of at least two different colors is deposited in the same physical location 40 on the medium 18. The colors mix in the location 40 to form the composite color. Conversely, in dot-next-to-dot printing, the color inks are deposited in adjacent locations on the medium 18, and when viewed from a distance the human eye perceives the colors to be mixed. However, even in dot-next-to-dot printing, some actual overlaying of colors occurs; if it did not, there would be unprinted white space remaining at the corners of pixels which would degrade print quality. To illustrate the overlaying of colors in dot-next-to-dot printing, one color ink is deposited at location 42, and a different color is deposited at location 44; the overlapping area 48 where the two inks mix contains the composite color. If there were no interactions between the ink and the media, the order in which the drops of different color ink are deposited on the medium 18 would not matter. However, because of the ink/media interactions, the composite color which is formed in locations 40,48 by combining the two different color inks has a different color shade, or hue, depending on the order in which the respective color drops were deposited. When two relatively large areas on the medium are printed with the same composite color, but each area has a different drop deposition order, the hue shift, or color difference, between the two areas is quite noticeable, particularly with darker shades of composite colors.

The configuration of the printheads 21 in the carriage 20 of a printer according to the present invention is such that, without the teachings of the present invention, the hue shift described above would occur during bidirectional printing. The reason for the hue shift is that the nozzles 70 of at least two printheads 21 overlap in the forward 2 or rearward 4 scan directions permits the printer 10 to deposit the ink drops of a composite color in a different order depending on whether the carriage 20 is moving over the area of the medium 18 to be printed in the forward 2 or the rearward 4 direction. As best discussed with reference to FIGS. 6A and 6B, the printer 10 preferably has four printheads, one each for cyan 21a, magenta 21b, and yellow 21c primary subtractive colors, with the fourth printhead 21d containing black ink. As known to those skilled in the art, black ink is often used to print black regions due to difficulties producing a high quality black from a combination of cyan, magenta, and yellow, and black may also be used in combination with the other colors when printing the deeper shades of colors.

Figure 6A:
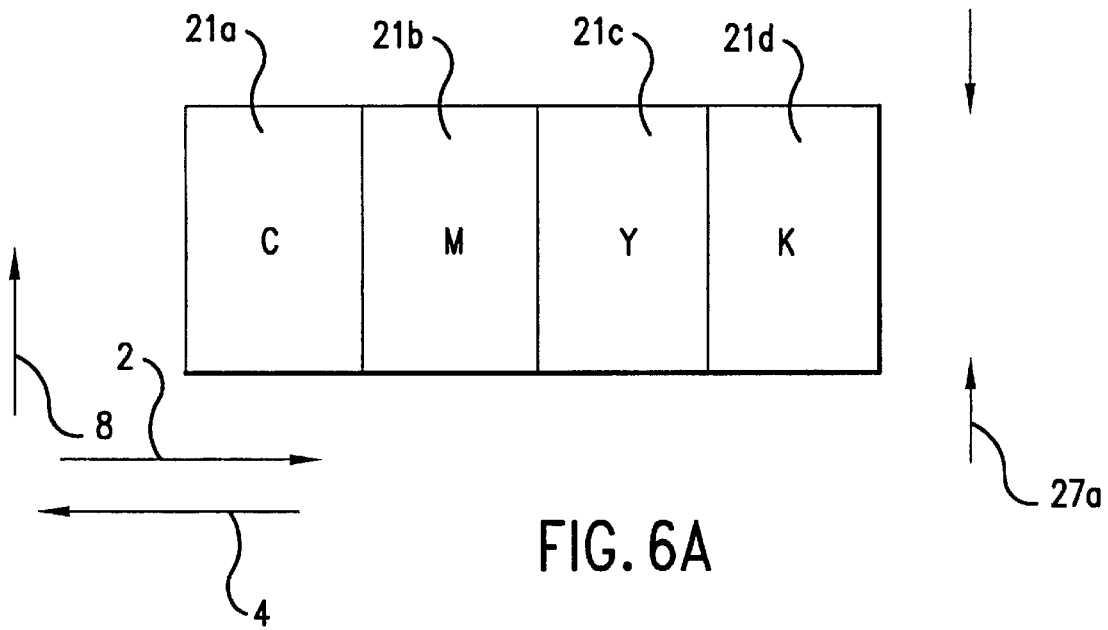
FIGS 6A–6B are schematic representations of relative arrangements of multiple printheads usable with the printer of FIG. 1.
Figure 6B:
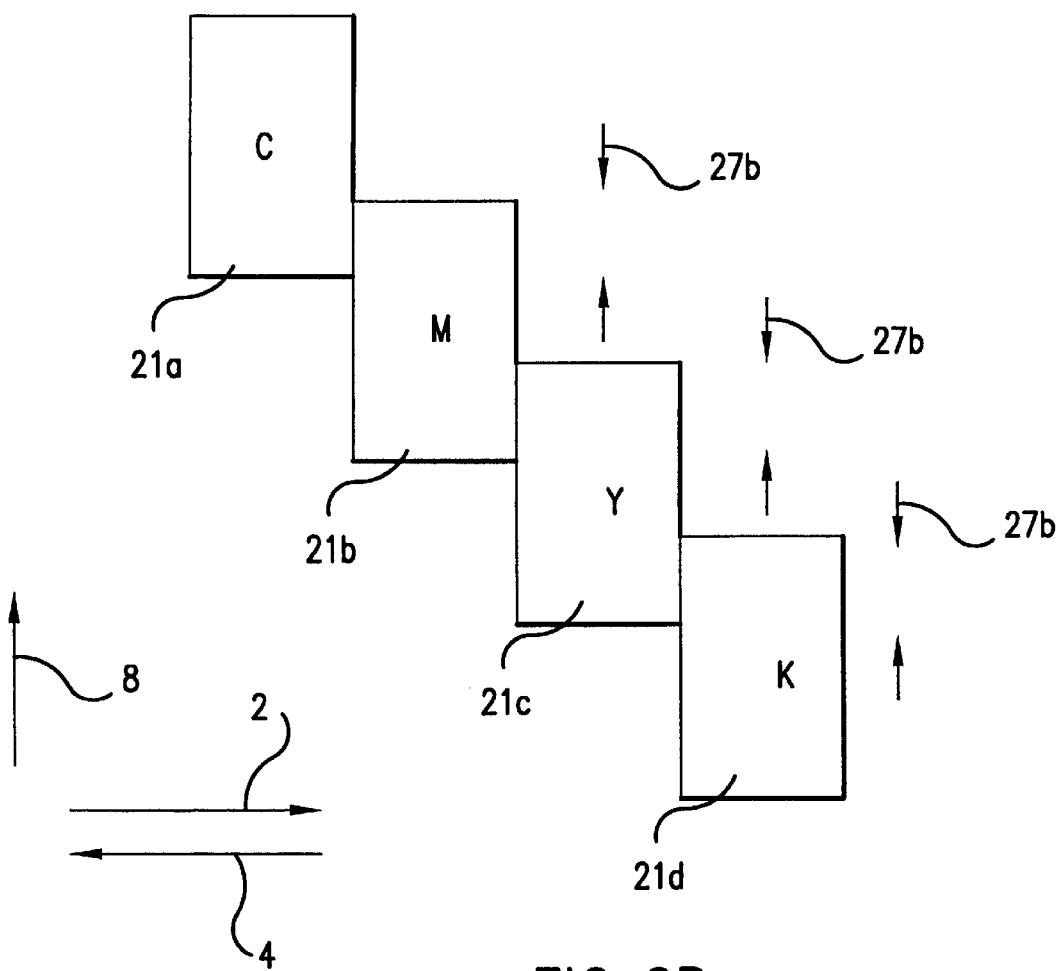

However, to simplify the illustrative examples, black will frequently be omitted from subsequent discussions herein. The nozzles 70 of printheads 21a–21d in the preferred embodiment of FIG. 6A are in-line and fully overlap in area 27a. In the alternate configuration of FIG. 6B, the nozzles 70 of printheads 21a–21d are partially offset one from another and thus overlap only in areas 27b, so that areas outside of areas 27b are passed over by nozzles of only one printhead in each forward 2 or rearward 4 scan. In areas 27a and 27b, as the carriage 20 transporting the printheads 21a–21d moves in the forward scan direction 2 from the edge of the medium 18, the yellow printhead 21c will move into printing position for a selected location 19 before the magenta printhead 21b, which in turn moves into position before the cyan printhead 21a. Therefore if, for example, the selected pixel 19 is to be printed with the composite color blue, magenta ink will be deposited on the pixel 19 before cyan ink. In the rearward scan direction 4, the order in which the printheads encounter the selected pixel 19 reverses, and cyan ink will be deposited before magenta ink. In the present invention, however, as will be discussed in greater detail subsequently, the print controller 58 minimizes the hue shift through the mask patterns used for the forward 62 and rearward 64 print masks for each ink color.

Figure 7:
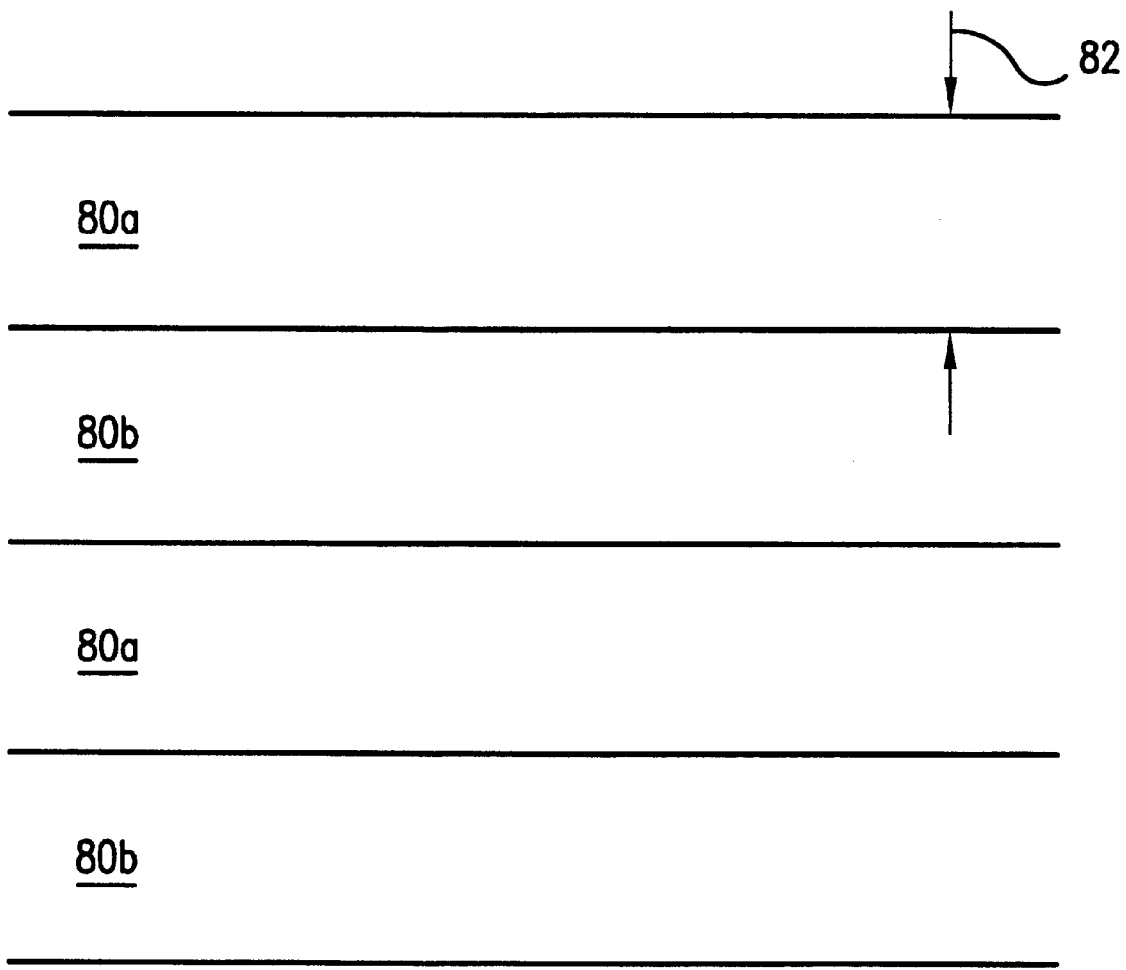
FIG. 7 is a schematic diagram of subswaths printed by the printer of FIG. 1.

Considering now the print medium advance mechanism 17 of the preferred embodiment in more detail, the print medium advance mechanism 17 advances the print medium 18 after each single scan in either the forward direction 2 or the rearward direction 4. Fewer than all the drops needed to fully print the image swath are deposited in a single forward or rearward scan, which helps avoid bleeding, banding and paper cockling as those skilled in the art know. Therefore, the medium 18 is advanced along the medium advance axis 8 one-half the height of the printed swath, and the next scan proceeds in the opposite direction. To optimize throughput, the second pass over any pixel image area will deposit the remaining ink drops needed to fully print it. The electromechanical mechanism for advancing the print medium is well understood by those skilled in the art, and will not be discussed further. As best understood with reference to FIG. 7, and ignoring the special case of the first and last subswath printed on the medium, operation of the medium advance mechanism 17 results in a medium 18 imprinted with a series of alternating subswaths 80a–80b, with the height 82 of each subswath 80a–80b substantially equaling one-half of the height of area 27a. The ink drops in each subswath 80a are laid down in a forward scan 2 followed by a rearward scan 4, while the ink drops in each subswath 80b are laid down in a rearward scan 4 followed by a forward scan 2. The mask patterns used for the forward 62 and rearward 64 print masks for each ink color minimizes the hue shift that would otherwise occur between subswaths 80a and 80b. While the preferred embodiment uses two scans to fully ink a subswath with an even one-half height medium advance between scans, alternate embodiments according to the present invention may utilize more than two scans to fully ink a subswath. In addition, alternate embodiments may advance the medium an unequal distance between scans, or not advance the medium at all after certain scans.

In discussing the print controller 58 in further detail with reference to FIG. 4, it is useful to discuss various transformations of the image data that typically occur as part of the process of depositing different color ink drops on the medium 18 to print the image. The image data is generated by an image generation system 52 and may include text and/or graphics created by a user on computer system and/or images derived from another source such as a scanner or a digital camera. The image data may initially be stored in any of a variety of data formats or computer graphics languages which frequently are independent of the characteristics of any particular printing device, but prior to printing are transformed by a color converter 53 into separate planes of pixels for cyan, magenta, and yellow (CMY) colors (and also black). Each set of pixels (one per plane) represents a portion of the image corresponding to the dots-per-inch printing resolution of the printer, and each pixel uses a number of bits, typically eight to thirty-six, to represent the intensity in each color plane. Because current inkjet printers typically can only reproduce from two to sixteen levels of intensity per pixel for each color, a renderer 54 renders or halftones the image data so as to reduce the image data to match the capability of the printer. In the preferred embodiment, the printer 10 is capable of printing one of three different intensities at each pixel location: dark (a maximum of four drops per color per pixel), light (one drop per color per pixel), and white (no drops printed). Therefore, the intensity for each pixel must be reduced to two bits per color. By judiciously arranging pixels of varying intensities, the halftoning algorithm can greatly increase the range of intensities (color depth) perceived by the human eye, allowing complex images such as photographs to be printed realistically. A variety of algorithms for halftoning are known to those skilled in the art, and therefore the process of halftoning will not be further discussed hereinafter.

Once rendering is complete and each pixel has been transformed into a format which matches the capability of the printer 10, the print controller 58 governs which ink drops will be printed in each scan of the printheads 21 by using the masking patterns specified by the forward print mask 62 and the rearward print mask 64 for each intensity level for each printhead 21. The partial-inking patterns of each pass combine as each subswath is printed on multiple passes to fully form the image. The combination of specific partial-inking patterns employed for each intensity level of each printhead in each scan, and the way these patterns add up to a single fully-inked image, is known as a "printmode", and the sequence of operations performed by the print controller 58 is referred to as "print mode generation".

Before discussing the process of print mode generation further, it will be helpful to first discuss the forward 62 and rearward 64 print masks in further detail in light of the printing resolution of the printer 10. In this regard, the printer 10 according to the preferred embodiment processes 600 by 600 dot per inch (dpi) images, printing these images with a resolution of 600 dots per inch in the media advance (vertical) direction 8, and 1200 dots per inch in the forward 2 and rearward 4 (horizontal) scan directions. Therefore, within a 600 by 600 dpi pixel location 19 on the print medium 18, the printer can deposit up to two drops of ink from each printhead 21 in the forward scan direction 2, and up to two drops of ink from each printhead 21 in the rearward scan direction 4. The printer is capable of depositing each of the two drops in different ones of the two 1200 by 600 dpi subpixels comprising the 600 by 600 dpi pixel location 19. In the preferred embodiment, each pixel location 19 is traversed by a forward 2 and a rearward 4 scan; therefore, a maximum total of four drops of a particular color ink could be printed in the pixel location 19. Whereas only one drop of each color ink may be deposited on the medium 18 in each 600 by 600 dpi pixel location 19 when printing light intensity pixels, multiple drops may be deposited when printing dark intensity pixels. If a composite color were to be formed by uniformly printing four drops of each of two different color inks in each location 19, as is done in the prior art, a hue shift would occur between alternating subswaths 80a and 80b printed with the composite color, as explained previously.

In contrast, the present invention uses print mask patterns for each different color which print the dark intensity color of each 600 by 600 dpi pixel location 19 with a variable number (two to three) of drops per color, rather than with a fixed number (eg. four) of drops per color. In addition, within each pixel location 19, the drops of each color ink are advantageously allocated between each of the two 1200 by 600 dpi subpixels to further reduce the hue shift. Furthermore, the number of drops and the allocation of drops between the 1200 dpi subpixels vary among different cells of the print masks, and differ in the forward and rearward scan directions. Also, the print masks have different mask patterns for different color inks. All of these aspects of the printer 10 combine to minimize the perceived hue shift between subswaths 80a and 80b printed with a printer according to the present invention. With the present invention, there is no need to trade off throughput to solve the hue shift problem, as would occur with masking off a top and a bottom group of nozzles on opposite passes as in the prior art.

Figure 8A:
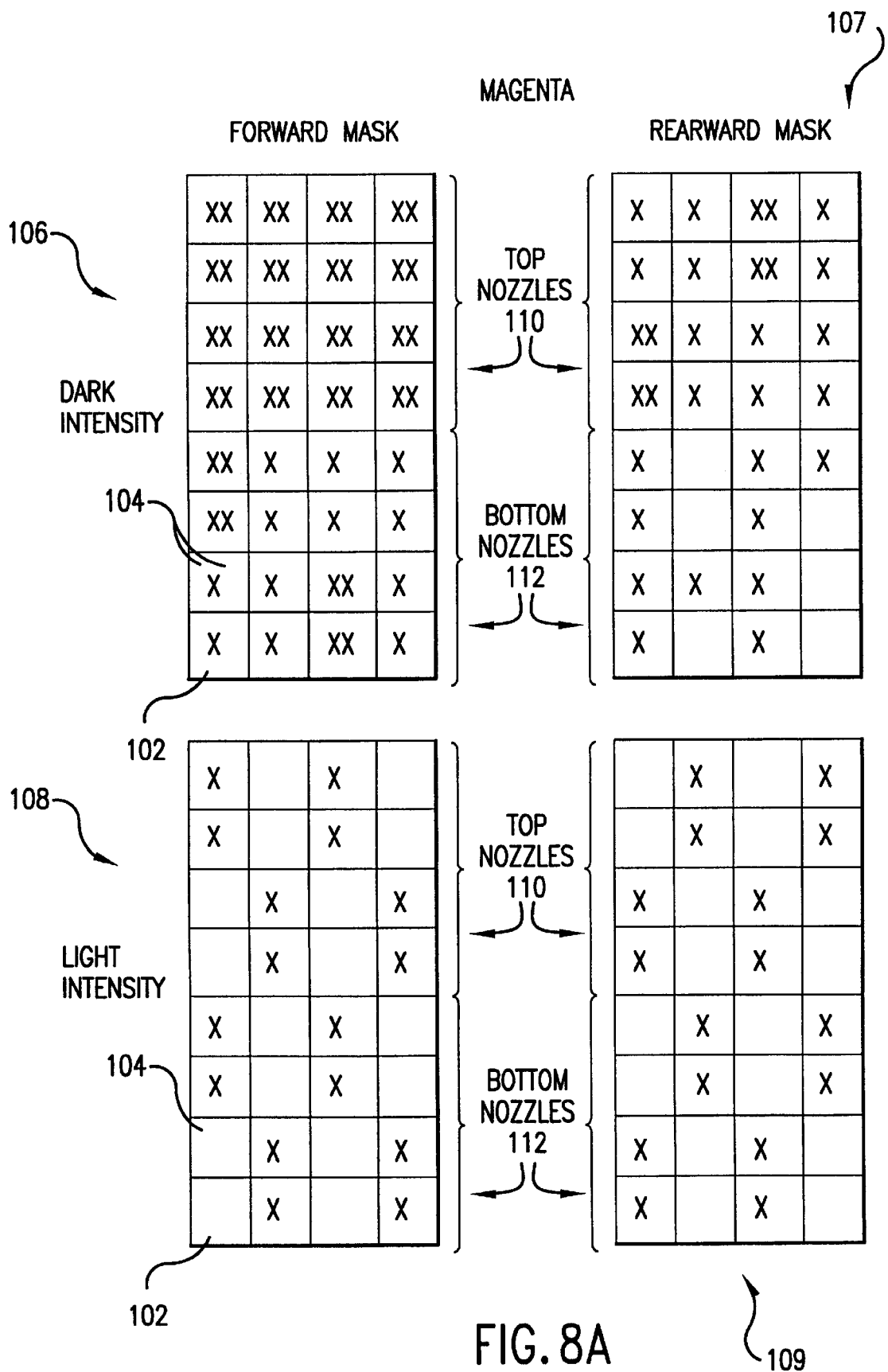
FIGS. 8A–8C are schematic diagrams of the forward and reverse print masks according to the present invention used for the dark and light intensity levels of magenta, cyan, and yellow inks, respectively.
Figure 8B:
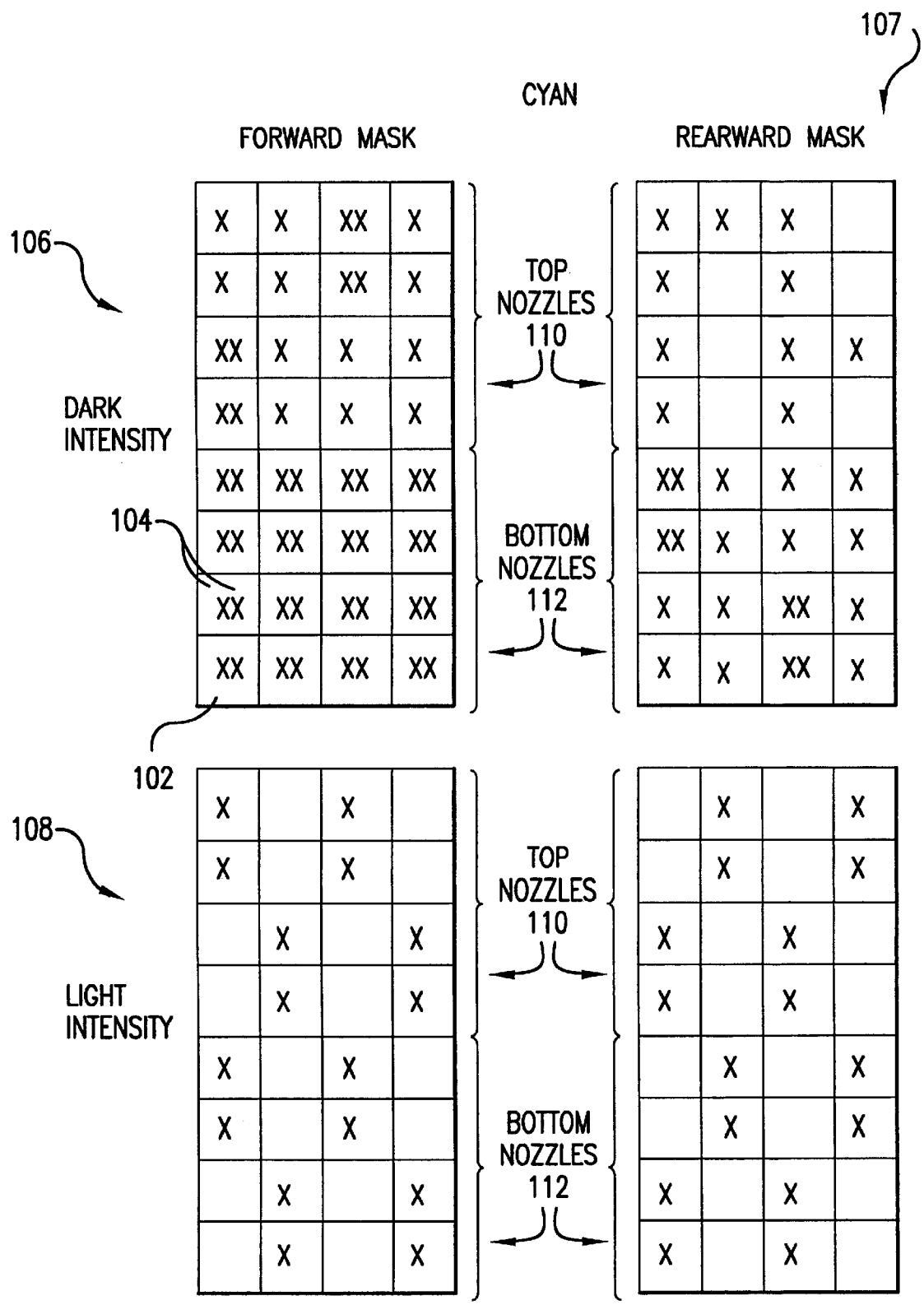
Figure 8C:
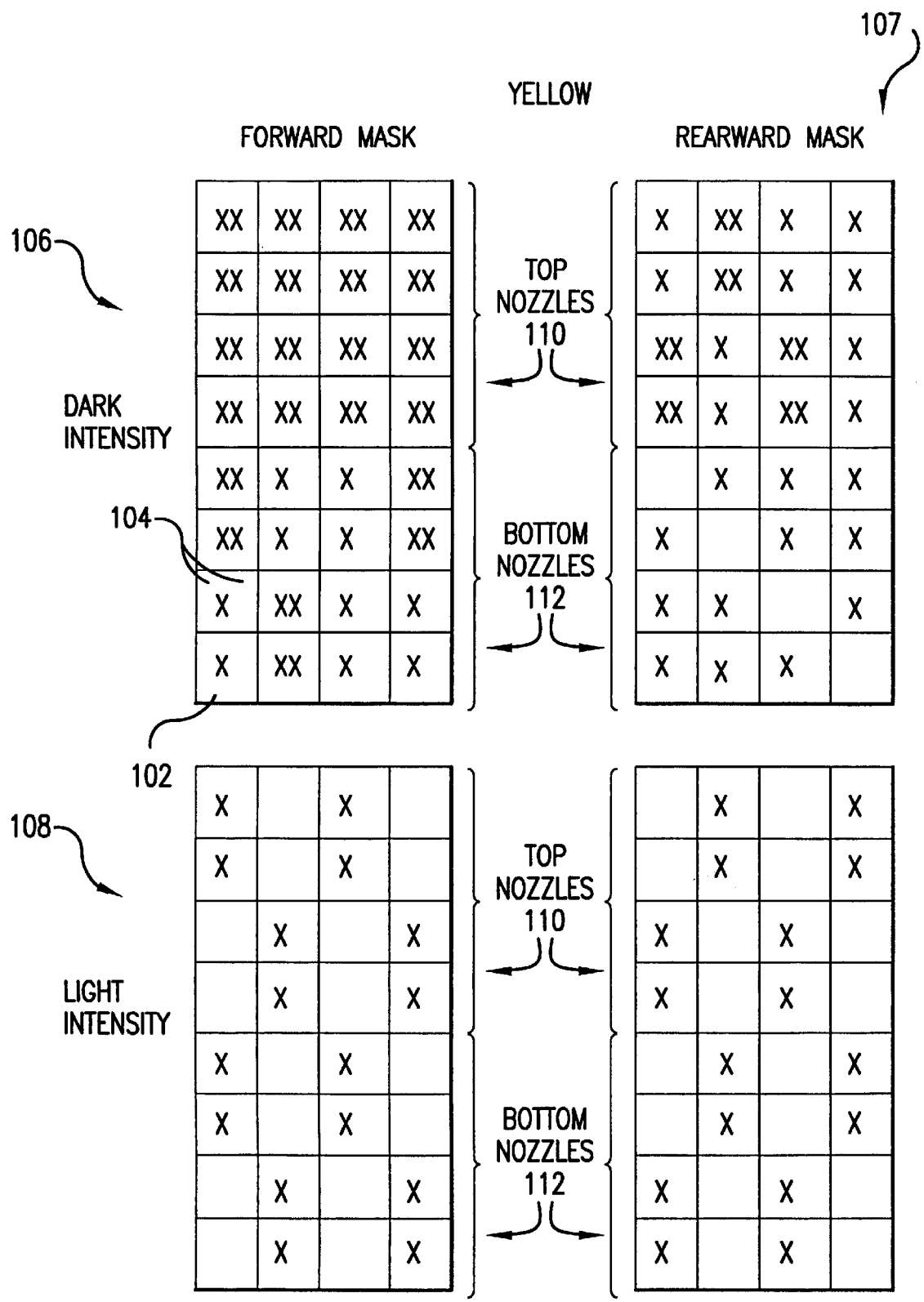

The forward 62 and rearward 64 print masks for each color ink are best understood with reference to FIGS. 8A–8C. Each print mask 62,64 consists of a two-dimensional array of print mask cells, each print mask cell (a representative one of which is indicated at 102) governing the printing of a 600 by 600 dpi pixel during a carriage scan. Within each print mask cell 102 are two mask values 104, each mask value governing one of the two 1200 by 600 dpi subpixels printable on the medium 18 in the forward 2 and rearward 4 scan directions for each corresponding 600 by 600 dpi image pixel. The nomenclature used in FIGS. 8A–8C is such that, if an "X" is present in the mask value 104, then a drop of ink will be deposited on the medium 18 in the appropriate subpixel of the location 19 if the image pixel has a dark intensity value for that color. Conversely, if there is no "X" present, no drop will be printed.

The set of print mask cells 102 in each print mask 62,64, taken together, define a mask pattern for the print mask, such as a forward mask pattern 106 and a rearward mask pattern 107 for the dark intensity level of each color ink. The forward mask pattern 106 is used to govern printing during a forward scan 2, while the rearward mask pattern 107 is used to govern printing during a rearward scan 4. Different mask patterns 108,109 are used for the light intensity level of each color ink (the white intensity level is a special case in which no ink drops will be printed). Each of the forward 106 and rearward 107 mask patterns are further split into a mask subpattern 110 for the top portion of nozzles 76 and a mask subpattern 112 for the bottom portion of nozzles 78.

In the preferred embodiment, the top portion 76 consists of the one hundred forty-four nozzles #7 through #150, and the bottom portion 78 consists of the one hundred forty-four nozzles #151 through #294. Having the same number of nozzles in both the top 76 and bottom 78 portions produces equal-sized subswaths for an even print advance after the forward 2 and rearward 4 scans of a distance corresponding to the height in the media advance direction 8 of the one hundred forty-four nozzles. Since, in the preferred embodiment, the mask subpatterns 110, 112 have a height in the media advance direction of only four pixels, the mask subpattern 110, 112 are replicated thirty-six times to govern all of the corresponding portions of nozzles 76,78. Similarly, since the mask subpatterns 110,112 have, in the preferred embodiment, a width in the scan direction of only four pixels, while the print media has 600 pixels per inch in the scan directions 2,4, the subpatterns 110,112 are repeated as required during the scan, as the carriage 20 transports the printheads 21 over the various pixel locations 19 on the medium 18.

The present invention can also be used in a printer having an uneven print advance mode where the number of nozzles allocated to the top 76 and bottom 76 portions, and the distance the medium is advanced following the forward scan 2 and the rearward scan 4, are unequal. In this situation, the mask subpatterns 110,112 would be replicated as necessary to encompass the total number of nozzles in each group. Although in the preferred embodiment each mask subpattern 110,112 for the top 76 and bottom 78 portions of nozzles is a four by four matrix, the present invention is not limited to a matrix of this size, nor to a matrix where the dimensions in the scan 2,4 and media advance directions 8 are equal.

Figure 9:
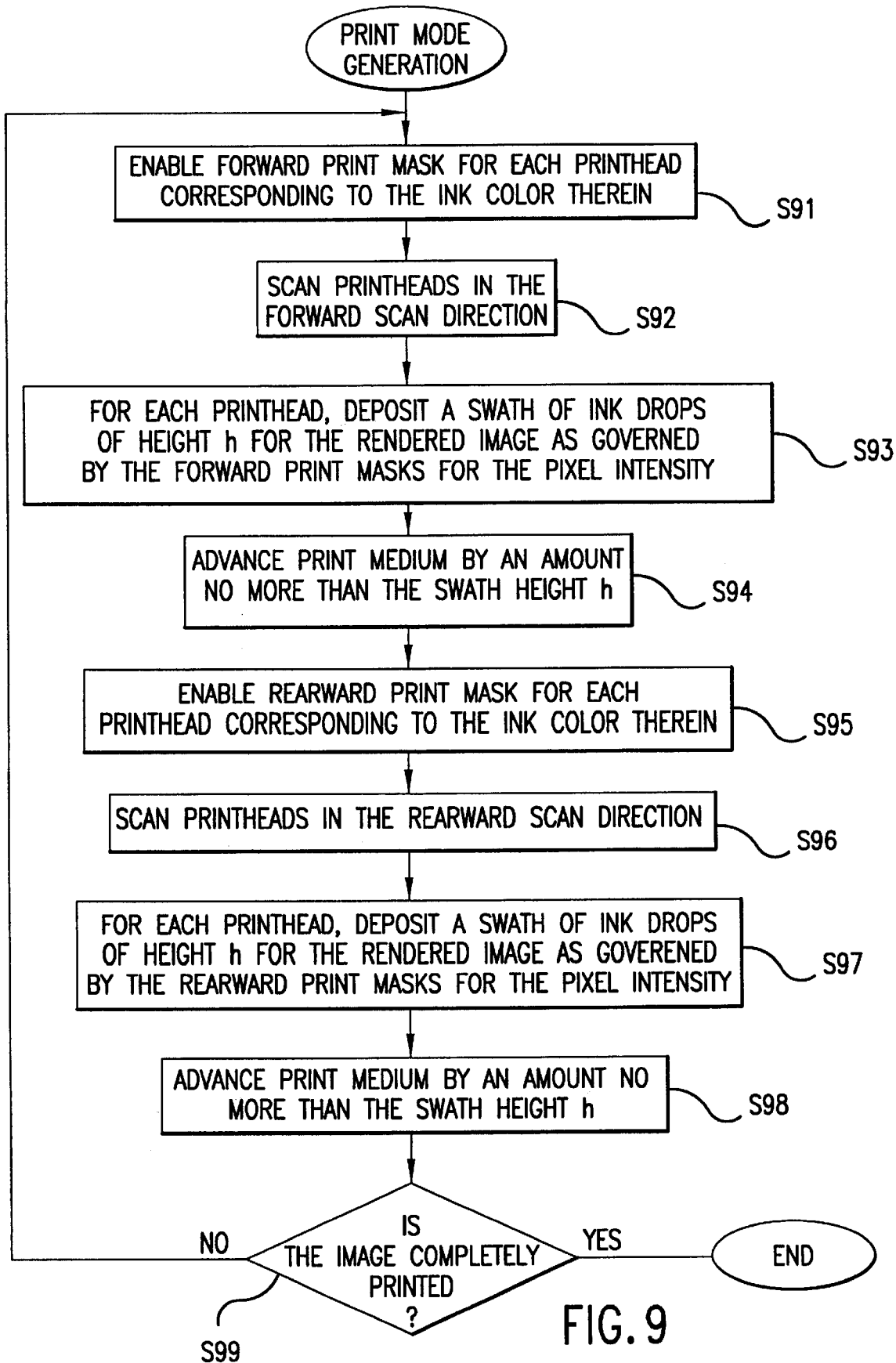
FIG. 9 is a flowchart of print mode generation according to the present invention for the printer of FIG. 1.

Considering now the process of print mode generation as best understood with reference to FIG. 9, print mode generation according to the present invention begins by enabling (step 91) the forward print masks 62 for the color ink contained in each of the printheads 21. Next, the carriage 20 begins to scan in the forward scan direction 2 (step 92). As the carriage 20 scans forward, the print controller 58 tracks the location in the scan direction of each printhead 21. As the scan proceeds in the forward direction, in step 93 the print controller 58 detects the pixel locations 19 for which the nozzles of each printhead 21 are currently in printing position, and determines from the rendered image data the intensity level of the corresponding color ink for each such pixel location 19. If the intensity is either dark or light, and if the mask value 104 of the corresponding print mask cell 102 in print mask 62 enables printing in that pixel location 19, the controller 58 fires the corresponding nozzle to deposit ink on that location 19.

When the forward scan has been completed, the print medium 18 is advanced (step 94) by an amount no more than the height of the swath corresponding to the array of ink nozzles before printing in the rearward direction 4. In the preferred embodiment, the medium is advanced by one-half the swath height, which corresponds to the height of one hundred forty-four nozzles. However, in alternate embodiments the swath could be advanced any amount between the full swath height and no advance at all.

The operation in the rearward scan direction 4 is analogous to that in the forward scan direction 2. The rearward print masks 64 are enabled (step 95), the carriage 20 begins to scan in the rearward scan direction 4 (step 96), the print controller 58 fires ink nozzles during the scan to deposit ink drops corresponding to the rendered image as governed by the rearward print masks 64 (step 97), and the print medium 18 is advanced (step 98). The amount by which the swath is advanced in step 98 may the same or different as in step 94, depending on whether the print advance is even or uneven, respectively.

If the image data has been completely printed (step 99), print mode generation ends. Otherwise, another forward scan will be performed starting at step 91. Note that for the first and last swaths printed on the media, the paper advance and nozzle firing will be adjusted to compensate for the starting and stopping of printing (not shown). The compensating methods are known to those skilled in the art, and will not be discussed further.

Figure 10:
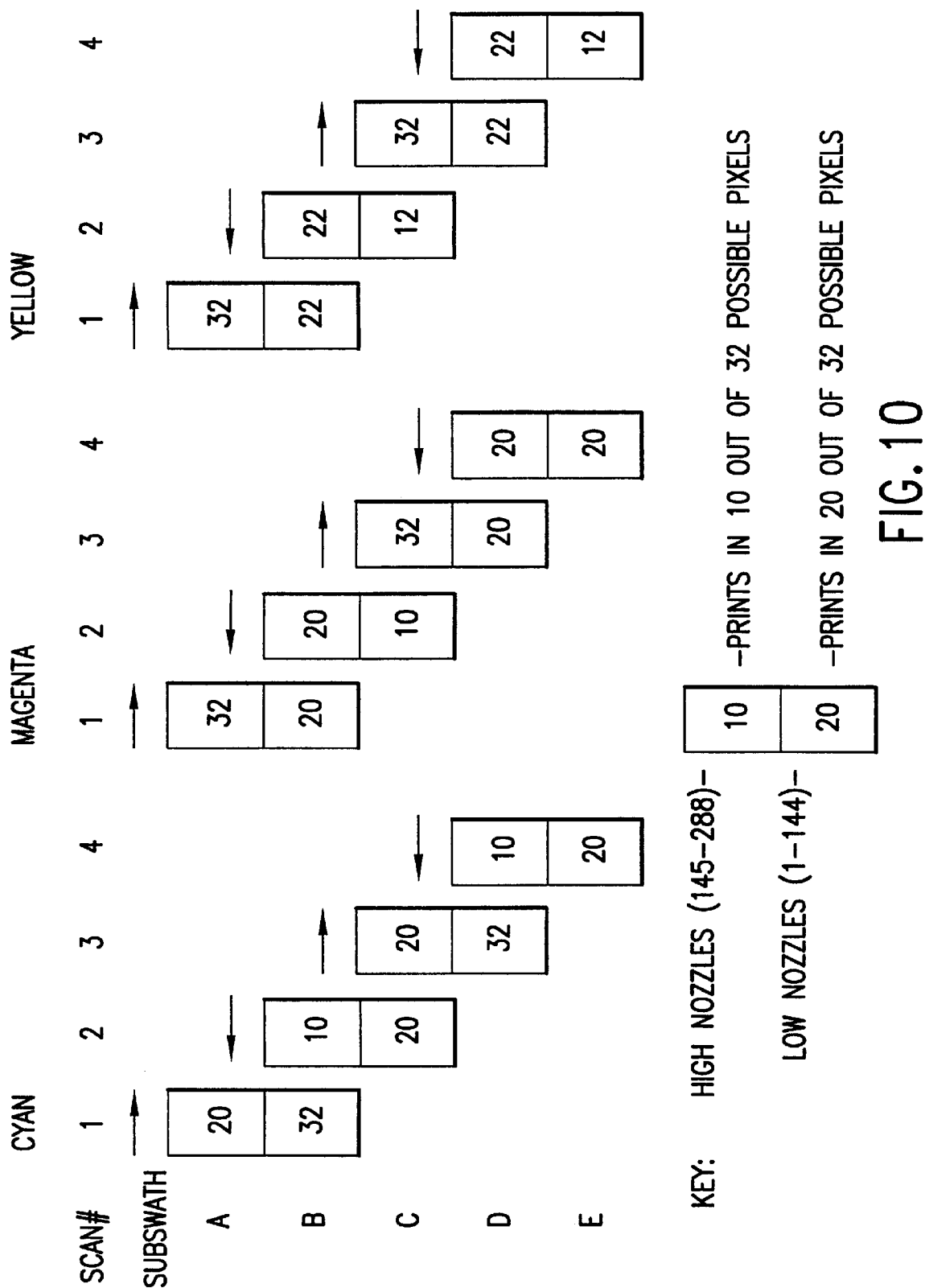
FIG. 10 is a schematic representation of the drop quantities printed from the top and bottom nozzle groups in each subswath during successive forward and backward carriage scans performed by the printer of FIG. 1.

FIG. 10 schematically depicts the results of performing the print mode generation process described in FIG. 9 to print four scans. Scans #1 and #3 occur in the forward scan direction 2, while scans #2 and #4 are in the rearward scan direction 4. Five printed subswaths (A through E) are shown. Cyan 21a, magenta 21b, and yellow printheads 21c are arranged in the printer in the order shown in FIG. 10; to simplify the example, assume that the top nozzle group 76a and the bottom nozzle 78a group each have only four nozzles, the page is only four 600 by 600 dpi pixels wide, and that each printhead passes completely over all thirty-two printable locations in the subswath before the next printhead reaches them. The number of drops of ink shown in FIG. 10 indicates the maximum number of drops which are enabled to be printed with the nozzle groups of each of the colors in each pass; the number of drops of each color which actually get printed in each pixel depends on the color and intensity of the image data to be printed.

Subswath B 120 is printed in the forward scan direction 2 followed by the rearward scan direction 4. In the forward direction 2 of scan #1, a maximum of twenty-two drops of yellow, then twenty drops of magenta, and finally thirty-two drops of cyan are enabled to be deposited from the bottom nozzles 78a into the thirty-two locations, in the positions indicated by the "X"'s in the forward scan, bottom nozzles print mask for the respective color. In the rearward direction 4 of scan #2, a maximum of ten drops of cyan, then twenty drops of magenta, and finally twenty-two drops of yellow are enabled to be deposited from the top nozzles 76a into the thirty-two positions indicated by the "X"'s in the rearward scan, top nozzle group print mask for the respective color.

Subswath C 122, by comparison, is printed in the rearward scan direction 4 followed by the forward scan direction 2. The rearward scan occurs at the same time as the rearward scan of subswath B. In the rearward direction 4 of scan #2, a maximum of twenty drops of cyan, then ten drops of magenta, and finally twelve drops of yellow are enabled to be deposited from the bottom nozzles 78a into the thirty-two positions indicated by the "X"'s in the rearward scan, bottom nozzle group print mask for the respective color. In the forward direction 2 of scan #3, a maximum of thirty-two drops of yellow, then thirty-two drops of magenta, and finally twenty drops of cyan are enabled to be deposited from the top nozzles 76a into the thirty-two locations, in the positions indicated by the "X"'s in the forward scan, top nozzles print mask for the respective color. The different number of ink drops of each color, and the positioning of these drops within the thirty-two possible locations, compensates for the hue shift that would otherwise occur based on the differing order of deposition of drops of each color ink.

Figure 11A:
FIGS. 11A–11C are schematic representations of the placement on and ordering within subpixels on the printed media of drops of two different color primary subtractive inks to form the composite colors blue, green, and red, respectively.
Figure 11B:
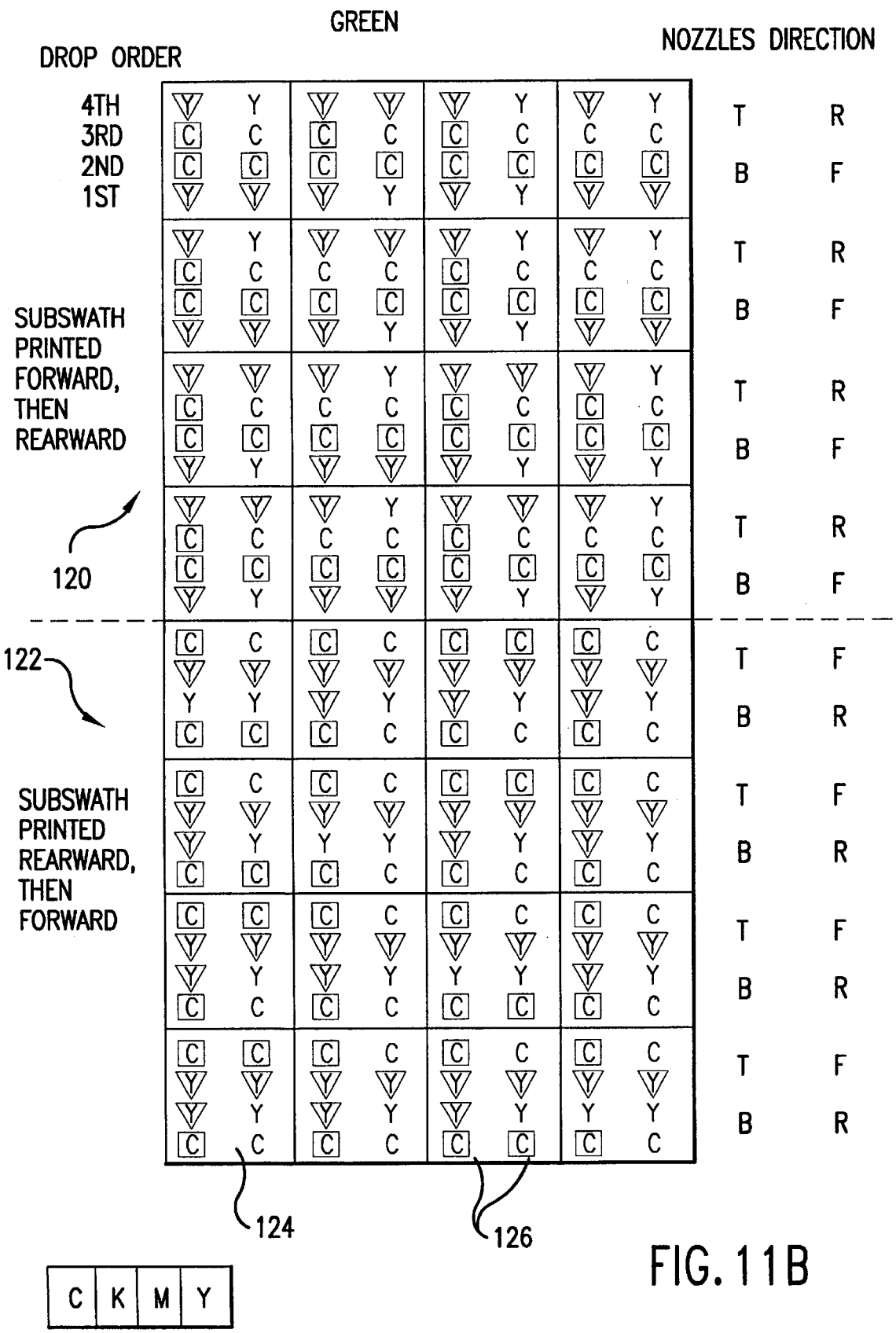
Figure 11C:
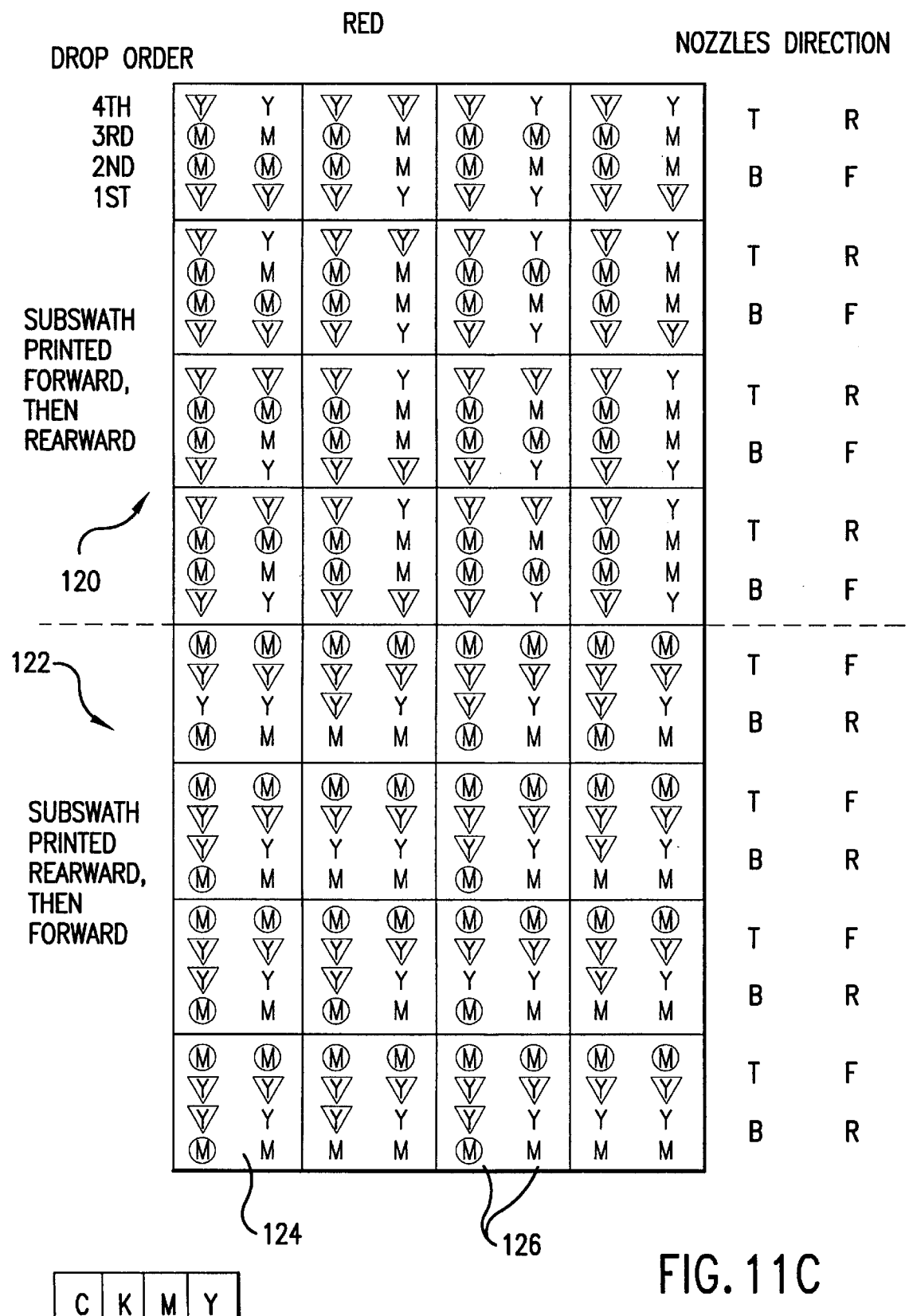

Considering now in more detail the cooperation between print masks to minimize hue shift with reference to FIGS. 11A–11C, assume that the rendered 600 by 600 dpi image data to be printed consists of a full page of dark intensity blue. Dark intensity composite colors tend to exhibit the most severe hue shift, with blue typically having a more severe shift than green or red. Dark intensity blue is produced by combining dark intensity cyan and dark intensity magenta (the inclusion in some embodiments of drops of black ink will be ignored for purposes of illustration). FIG. 11A schematically illustrates dark intensity blue as printed in subswath B 120 and subswath C 122. Within each printed image pixel 124 there are two columns 126 corresponding to the positions of the two mask values 104. The drop deposition order is indicated within each column; the earliest deposited drop at the bottom, and the latest deposited drop at the top. M indicates potential magenta drops, C indicates potential cyan drops, and Y indicates possible yellow drops. Drops actually deposited are encircled.

The various print mask subpatterns were determined experimentally to correct for the hue shift that would otherwise occur in the absence of the print masks of this invention. Without correction, subswath B would exhibit a magentaish cast, and subswath C would exhibit a cyanish cast. However, the present invention provides in subswath B some print locations containing only cyan drops 128a, or where cyan drops are printed over magenta drops 130a, which reduce the magentaish cast. Similarly, it provides in subswath C some print locations containing only magenta drops 128b, or where magenta drops are printed over cyan drops 130b, which reduce the cyanish cast. The cooperative effect of the print locations 128a,128b,130a,130b is to reduce the hue shift perceived in the composite color blue of the adjacent subswaths, thus making banding within the image much less noticeable. FIGS. 11B and 11C use the same principles as explained for FIG. 11A to reduce the perceived hue shifts in green and red, respectively. While for purposes of illustration FIGS. 11A–11C illustrate the operation of the invention in a two-pass printmode, the invention is applicable to multipass printmodes using more than two passes to fully ink a subswath.

Colorimetry measurements known to those skilled in the art can quantify the reduction in hue shift resulting from the present invention. For example, when pages of the dark intensity composite colors red (R), green (G), and blue (B) are printed using the mask patterns of FIGS. 8A–8C of the present invention and compared to pages printed without the benefit of this invention, significant improvements are noted. Color Accuracy, for instance, may be improved by a ratio of approximately 1.4 for red (which tends to exhibit less hue shift using the prior art mask patterns than blue or green), to as much as approximately 3.6 for blue. Similar improvements in Delta H and Hue Angle are also evident.

A number of alternative arrangements for delivering ink to the printheads are usable with the present invention, as illustrated schematically in FIGS. 2A through 2D. Each printhead 21 is housed in a cartridge 32a–32d. A cartridge 32a–32d may contain only one printhead 21 for one ink color, or it may contain multiple printheads for multiple colors, such as a tricolor cartridge containing three printheads for cyan, magenta, and yellow respectively. The multiple printheads may be constructed on a single substrate or on different substrates. the ink may be supplied to the printhead 21 in different ways. In FIG. 2A, an ink reservoir 38a is housed within the print cartridge 32a along with the printhead. In FIG. 2B, an ink reservoir 38b is detachable from the print cartridge 32b, but the reservoir 38b is attached to the print cartridge 32b when they are installed in the carriage 20. In FIG. 2C, the print cartridge 32c does not contain an ink reservoir; ink is supplied to the cartridge 32c instead from an off-chute ink reservoir 38c via a tube 39c. In FIG. 2D, the main ink reservoir 38d is similarly located off-chute and connected to the print cartridge 32d via a tube 39d, but the print cartridge 32d also contains an auxiliary reservoir 38e. The present invention may be utilized with any of these cartridge configurations and ink delivery systems, and with other design alternatives in which the printhead 21 and the print media 18 are in relative motion to each other.

From the foregoing it will be appreciated that the printer provided by the present invention represents a significant advance in the art. An inkjet printer can be constructed according to the present invention so as to minimize hue shift while still retaining all the advantages of multipass bidirectional printing, without the need to reduce throughput or increase the manufacturing cost or complexity of the printer. Also, while the invention is described herein with reference to printmasks which are static, the invention is applicable to dynamically generated masks or algorithms that control which nozzles address a given pixel in a given pass of a multipass printer. In addition, while the present invention has been described for illustrative purposes with reference to printing swaths of the same composite color, the invention is widely applicable to improving the print quality of images and graphics of every sort. Although several specific embodiments of the invention have been described and illustrated, the invention is not to be limited to the specific methods, forms, or arrangements of parts so described and illustrated. The invention is limited only by the claims.

What is claimed is:

1. A swath printer, comprising:
   a frame;
   a carriage attached to the frame for relative motion in a forward direction and a rearward direction with respect to a print medium;
   at least two printheads each having a different color ink and mounted on the carriage in a given position such that at least some drops of both different color inks can be sequentially deposited in at least a partially overlapping swath on the print medium;
   a print controller operatively connected to the carriage and the at least two printheads in order to scan the printheads over the print medium in both the forward and rearward directions for depositing ink in a same subswath of the overlapping swath; and
   for each printhead, a forward and a rearward print mask operatively coupled to the print controller for governing the deposition of the different color inks when the carriage is moved in the forward and the rearward directions respectively, the print masks having cooperative mask patterns which define the sequence in which drops are deposited in the subswath so as to minimize print quality defects caused by the sequence of color ink drop deposition.

2. The swath printer of claim 1, further including:
   a print medium advance mechanism operatively coupled to the carriage to advance the carriage relative to the print medium in a medium advance direction.

3. The swath printer of claim 2, wherein the carriage is advanced in the medium advance direction after at least some scans in the forward or rearward direction.

4. The swath printer of claim 2, wherein the carriage is advanced in the medium advance direction after each scan in the forward or rearward direction.

5. The swath printer of claim 4, wherein the carriage is advanced an equal distance after each scan.

6. The swath printer of claim 4, wherein the carriage is advanced at least two unequal distances after different scans.

7. The swath printer of claim 1, wherein the at least two printheads are mounted on the carriage in an in-line position in which all the at least two printheads can deposit ink in a substantially overlapping swath during a single scan.

8. The swath printer of claim 1, wherein at least one of the at least two printheads are mounted on the carriage in an offset position from at least one other of the at least two printheads such that the at least one printhead can deposit ink in a different subswath from the at least one other printhead during a single scan.

9. The swath printer of claim 1, wherein the at least some drops of both different color inks are deposited in a substantially overlapping drop-on-drop printing mode.

10. The swath printer of claim 1, wherein the at least some drops of both different color inks are deposited in an at least partially non-overlapping drop-next-to-drop printing mode.

11. The swath printer of claim 1, wherein each different color ink is selected from the group of primary subtractive colors cyan, magenta, and yellow.

12. The swath printer of claim 1, wherein at least two of the different color inks have different chroma.

13. The swath printer of claim 1, wherein the forward print masks are different for at least two of the printheads, and wherein the rearward print masks are different for at least two of the printheads.

14. The swath printer of claim 1, wherein the forward print mask and the rearward print mask for at least one of the inks have different mask patterns.

15. The swath printer of claim 1, further comprising: a plurality of color intensity levels printable on the print medium for each different color ink.

16. The swath printer of claim 15, wherein each intensity level is formed by depositing a different number of ink drops.

17. The swath printer of claim 15, further including:
   different forward and rearward print masks for each intensity level.

18. The swath printer of claim 1, wherein the different color ink for each printhead is contained within a print cartridge housing the printhead.

19. The swath printer of claim 1, wherein the different color ink for each printhead is supplied to the printhead from an ink reservoir mounted off the carriage.

20. The swath printer of claim 1, further comprising:
   a plurality of ink-ejecting nozzles mounted on each of the at least two printheads and divided into at least two nozzle groups, the forward and rearward print masks for each printhead having separate mask patterns for each of the at least two nozzle groups.

21. The swath printer of claim 1, wherein each different color ink is selected from the group of cyan, magenta, yellow, and black.

22. A bidirectional swath printer, comprising:
   a frame;
   a carriage attached to the frame for relative motion in a forward direction and a rearward direction with respect to a print medium;
   at least two printheads each having a different color ink and mounted on the carriage in a given position such that drops of the different color inks can be sequentially deposited on a same area of the print medium in a single scan of the printheads in the forward or the rearward direction to form a composite color;
   a print controller operatively connected to the carriage and the at least two printheads in order to scan the printheads over the print medium and deposit ink in both the forward and rearward directions; and
   for each printhead, a forward and a rearward print mask operatively coupled to the print controller for governing the depositing of ink when the carriage is moved in the forward and the rearward directions respectively, the forward and rearward print masks having cooperating mask patterns which define the order of drop deposition such that a first area printed with the composite color by scanning the printheads in the forward direction followed by the rearward direction has a similar color shade to a second area printed with the composite color by scanning the printheads in the rearward direction followed by the forward direction.

23. The bidirectional swath printer of claim 22, wherein the print medium has a plurality of pixel locations, on some of which drops of the different color inks can be deposited during a single scan.

24. The bidirectional swath printer of claim 23, wherein the mask patterns for the forward and rearward print masks vary the order in which drops of the different color inks are deposited for different pixel locations printed with the composite color.

25. The bidirectional swath printer of claim 23, wherein the mask patterns for the forward and rearward print masks vary the amount of the ink deposited on different pixel locations printed with the composite color.

26. The bidirectional swath printer of claim 25, wherein the amount of the ink deposited on different pixel locations corresponds to the number of drops of the ink.

27. The bidirectional swath printer of claim 26, wherein each of the plurality of pixel locations further includes at least two subpixels, each subpixel having an allocated number and deposition order of ink drops, the sum of the allocated number of ink drops for the at least two subpixels equaling the number of the at least some ink drops of both different colors deposited at the corresponding pixel location.

28. A method for printing on a print medium with a bidirectional inkjet printer, comprising:
   orienting in the printer at least two printheads each having a different color ink in an orientation such that at least a portion of each of the at least two printheads are sequentially positioned adjacent a same area of the print medium when the printheads traverse the print medium, the sequence in which the at least two printheads are positioned adjacent the same area in a forward scan direction being inverted from the order in a rearward scan direction;
   printing a composite color in a first area of the print medium by traversing the printheads in the forward direction followed by the rearward direction;
   printing the composite color in a second area of the print medium by traversing the printheads in the rearward direction followed by the forward direction;
   applying a forward print mask to each of the at least two printheads to govern the order of depositing the different color inks when the printheads traverse the print medium in the forward scan direction; and
   applying a rearward print mask to each of the at least two printheads to govern the order of depositing the different color inks when the printheads traverse the print medium in the rearward scan direction, the forward and rearward print masks having cooperating mask patterns which regulate the order of depositing such that the composite color appears similar in the first and second areas.

29. The method of claim 28, wherein the first and second areas of the print medium further include a plurality of pixel locations.

30. The method of claim 29, wherein the applying the forward and the rearward print masks further comprises:
   varying the amount of each different color ink deposited in different ones of the plurality of pixel locations within the same one of the first and second areas.

31. The method of claim 29, wherein the applying the forward and the rearward print masks further comprises:
   varying the order of depositing the different color inks in different ones of the pixel locations within the same one of the first and second areas.

32. The method of claim 29, wherein selected ones of the plurality of pixel locations further include at least two subpixels, and wherein the applying the forward and the rearward print masks further comprises:
   allocating drops of the different color inks between the at least two subpixels of each of the selected ones of the plurality of pixel locations so as to vary the order of depositing ink in the at least two subpixels.

33. The method of claim 29, wherein the order of depositing the ink differs between at least some of the pixel locations in at least one of the first and second areas.

34. The method of claim 29, wherein the amount of each different color ink deposited in each of the pixel locations differs between at least some of the pixel locations in at least one of the first and second areas.

35. The method of claim 29, wherein the applying the forward and the rearward print masks further comprises for each different color ink printhead, enabling the deposition of a different amount of ink in the forward scan direction than in the rearward direction.

36. The method of claim 29, wherein each printhead further has a plurality of ink-ejecting nozzles divided into a top and a bottom nozzle groups, and wherein the applying the forward and the rearward print masks further comprises:
   enabling the deposition of a different amount of ink from the top nozzle group than from the bottom nozzle group.

37. The method of claim 28, wherein each of the at least two printheads has a plurality of nozzles defining a printable swath width orthogonal to the forward and rearward scan directions, further comprising:
   advancing the print medium in a medium advance direction a distance equal to a portion of the swath width after each traversal of the print medium in either scan direction.

38. The method of claim 37, further comprising:
   dividing the plurality of nozzles into at least two nozzle groups, each group having a width equal to a portion of the swath width; and
   for each of the forward and rearward print masks, applying different mask patterns to each of the at least two nozzle groups.

39. The method of claim 38, wherein the plurality of nozzles is divided substantially equally between each of the at least two nozzle groups.

40. The method of claim 38, wherein the plurality of nozzles is divided unequally between each of the at least two nozzle groups.

41. The method of claim 38, wherein each mask pattern for a nozzle group is of size y pixels in the medium advance direction and each printable swath is of size Y pixels in the medium advance direction, where y<Y, further comprising:
   replicating each mask pattern Y/y times to form each of the corresponding forward and rearward print masks.

42. The method of claim 38, wherein each mask pattern for a nozzle group is of size x pixels in the forward or rearward scan direction, and each printable swath is of size X pixels in the scan direction, where x<X, further comprising:
   repeating each mask pattern X/x times as the at least two printheads traverse in the forward or rearward scan direction.

43. In a bidirectional swath printer having at least two printheads, each printhead depositing on a print medium ink droplets of a different color, the printer capable of printing a composite color by sequentially depositing on the print medium ink droplets of the at least two different colors during a scan of the printheads across the print medium in both a forward and a rearward direction, a method of printing comprising:

applying each of at least two forward print masks to each of the corresponding at least two printheads during scanning in the forward direction;

printing the composite color according to the at least two forward print masks in a first region while scanning in the forward direction;

applying each of at least two rearward print masks to each of the corresponding at least two printheads during scanning in the rearward direction; and printing the composite color according to the at least two rearward print masks in a second region while scanning in the rearward direction, the first region and the second region having a similar color shade.

44. A method of printing with a swath printer having a plurality of printheads for printing inks of different colors, the plurality of printheads aligned such that at least two of the printheads can deposit ink in a same region of a print medium in a single scan of the printheads in a forward or a rearward direction with respect to the print medium so as to print a composite color, comprising:

selectively printing a first swath of ink droplets as regulated by a forward print mask for each printhead while scanning the printheads in the forward direction;

advancing the print medium in a media advance direction at least partially orthogonal to the forward and rearward directions an amount corresponding to a portion of the width of the first pattern;

selectively printing a second pattern of ink droplets as regulated by a rearward print mask for each printhead while scanning the printheads in the rearward direction, the second pattern partially overlapping the first pattern to form a first subswath;

further advancing the print medium in the media advance direction an amount corresponding to a portion of the width of the second pattern; and selectively expelling a third pattern of ink droplets as regulated by the forward print mask for each printhead while scanning the plurality of printheads over the print medium in the forward direction, the third pattern partially overlapping the second pattern but not the first pattern to form a second subswath, the forward and rearward print masks for each printhead having printing patterns such that a first composite color region printed in the first subswath has a similar hue to a second composite color region printed in the second subswath.

45. In a bidirectional printer, a method of printing areas of composite colors by depositing at least two ink colors on a print medium in differing orders, comprising:

sweeping a first and a second printhead each supplying one of the at least two ink colors over the print medium in a forward scan direction such that the first printhead passes over a printing area before the second printhead;

depositing the at least two ink colors onto the print area according to forward print masks for the first and second printheads, the forward print masks having printing patterns which compensate for the first printhead passing over the first print location before the second printhead;

sweeping the first and the second printheads over the print medium in a rearward scan direction such that the second printhead passes over the printing area before the first printhead;

depositing the at least two ink colors onto the print area according to rearward print masks for the first and second printheads, the rearward print masks having printing patterns different from the forward print masks which compensate for the second printhead passing over the print location before the first printhead;

printing a first subswath by sequentially performing sweeping in the forward scan direction, depositing according to the forward print masks, sweeping in the rearward scan direction, and depositing according to the rearward print masks, the composite color in the first swath having a first color cast; and printing a second subswath by sequentially performing sweeping in the rearward scan direction, depositing according to the rearward print masks, sweeping in the forward scan direction, and depositing according to the forward print masks, the composite color in the second swath having a second color cast visually similar to the first color cast.

* * * * *